(12) United States Patent
Weber et al.

(10) Patent No.: US 7,840,905 B1
(45) Date of Patent: *Nov. 23, 2010

(54) CREATING A THEME USED BY AN AUTHORING APPLICATION TO PRODUCE A MULTIMEDIA PRESENTATION

(75) Inventors: Ralf Weber, Santa Clara, CA (US); Thomas Alsina, Paris (FR)

(73) Assignee: Apple Inc., Cupertino, CA (US)

( * ) Notice: Subject to any disclaimer, the term of this patent is extended or adjusted under 35 U.S.C. 154(b) by 633 days.

This patent is subject to a terminal disclaimer.

(21) Appl. No.: 10/742,957

(22) Filed: Dec. 20, 2003

Related U.S. Application Data

(63) Continuation-in-part of application No. 10/337,924, filed on Jan. 6, 2003, now Pat. No. 7,546,544.

(51) Int. Cl.
- G06F 3/00 (2006.01)
- G06F 17/30 (2006.01)
- G09G 5/00 (2006.01)

(52) U.S. Cl. .................. 715/765; 715/500; 345/619
(58) Field of Classification Search ............. 715/765, 715/500; 345/619
See application file for complete search history.

(56) References Cited

U.S. PATENT DOCUMENTS

| | | |
|---|---|---|
| 5,519,828 A | 5/1996 | Rayner |
| 5,737,552 A | 4/1998 | Lavallee et al. |
| 5,752,029 A | 5/1998 | Wissner |
| 5,778,108 A | 7/1998 | Coleman, Jr. |
| 5,956,026 A | 9/1999 | Ratakonda |
| 5,995,095 A | 11/1999 | Ratakonda |
| 6,064,438 A | 5/2000 | Miller |
| 6,111,562 A * | 8/2000 | Downs et al. ............... 715/862 |
| 6,230,172 B1 | 5/2001 | Purnaveja et al. |
| 6,307,550 B1 | 10/2001 | Chen et al. |
| 6,453,459 B1 | 9/2002 | Brodersen et al. |
| 6,714,216 B2 | 3/2004 | Abe |
| 6,731,295 B1 | 5/2004 | MacInnis et al. |
| 6,760,042 B2 | 7/2004 | Zetts |
| 6,912,327 B1 | 6/2005 | Hori et al. |
| 6,928,613 B1 | 8/2005 | Ishii et al. |
| 6,954,894 B1 | 10/2005 | Balnaves et al. |

(Continued)

OTHER PUBLICATIONS

Ozer, Jan, "DVD Authoring", Jan. 2005, PC Magazine, vol. 24 Issue 1, p. 160-160.*

(Continued)

*Primary Examiner*—William L Bashore
*Assistant Examiner*—Jordany Núñez
(74) *Attorney, Agent, or Firm*—Adeli & Tollen LLP

(57) ABSTRACT

A menu theme is created using a menu theme description file that contains a general description of each object (such as a drop zone area, selectable menu buttons, menu title, theme background, etc.) contained in the menu theme. In addition, the menu theme description file contains a path to one or more patch files for each object in the menu theme, the patch file being used to render the object. The patch file contains a description of an arrangement of modules including a list of the modules and relationships between them. In some embodiments, a patch file is created using a composer application that displays a graphical representation of the patch file and translates the graphical representation to a textual representation.

38 Claims, 17 Drawing Sheets

U.S. PATENT DOCUMENTS

| | | | |
|---|---|---|---|
| 6,988,244 B1 | 1/2006 | Honda et al. | |
| 7,030,872 B2 | 4/2006 | Tazaki | |
| 7,124,366 B2 | 10/2006 | Foreman et al. | |
| 7,127,149 B1 | 10/2006 | Lin | |
| 7,165,219 B1 | 1/2007 | Peters et al. | |
| 7,200,836 B2 | 4/2007 | Brodersen et al. | |
| 7,546,544 B1 | 6/2009 | Weber et al. | |
| 7,694,225 B1 | 4/2010 | Weber et al. | |
| 2002/0019833 A1* | 2/2002 | Hanamoto | 707/500 |
| 2002/0167540 A1 | 11/2002 | Dobbelaar | |
| 2002/0180803 A1 | 12/2002 | Kaplan et al. | |
| 2002/0194195 A1* | 12/2002 | Fenton et al. | 707/104.1 |
| 2002/0198909 A1* | 12/2002 | Huynh et al. | 707/513 |
| 2003/0016240 A1 | 1/2003 | Hanes | |
| 2003/0052897 A1* | 3/2003 | Lin | 345/619 |
| 2003/0090507 A1 | 5/2003 | Randall et al. | |
| 2003/0189588 A1 | 10/2003 | Girgensohn et al. | |
| 2003/0193520 A1 | 10/2003 | Oetzel | |
| 2003/0210261 A1 | 11/2003 | Wu et al. | |
| 2004/0017390 A1 | 1/2004 | Knowlton et al. | |
| 2004/0021684 A1 | 2/2004 | Millner | |
| 2004/0085340 A1 | 5/2004 | Dimitrova et al. | |
| 2004/0125124 A1 | 7/2004 | Kim et al. | |
| 2004/0125129 A1 | 7/2004 | Marsh | |
| 2004/0125133 A1 | 7/2004 | Pea et al. | |
| 2004/0201610 A1 | 10/2004 | Rosen et al. | |
| 2004/0221227 A1 | 11/2004 | Wu | |
| 2009/0249211 A1 | 10/2009 | Weber et al. | |

OTHER PUBLICATIONS

Zaman, Ashok, "DVD Authoring Software", Sep. 2005, APC (Australian Personal Computer), vol. 25 Issue 9, p. 68-74.*
Non-Final Office Action of U.S. Appl. No. 10/337,907, Aug. 22, 2007 (mailing date), Weber, Ralph, et al.
Final Office Action of U.S. Appl. No. 10/337,907, Mar. 24, 2008 (mailing date), Weber, Ralph, et al.
Non-Final Office Action of U.S. Appl. No. 10/337,907, Oct. 14, 2008 (mailing date), Weber, Ralph, et al.
Non-Final Office Action of U.S. Appl. No. 10/337,924, Apr. 4, 2006 (mailing date), Weber, Ralph, et al.
Final Office Action of U.S. Appl. No. 10/337,924, Nov. 1, 2006 (mailing date), Weber, Ralph, et al.
Final Office Action of U.S. Appl. No. 10/337,924, Dec. 27, 2007 (mailing date), Weber, Ralph, et al.
Non-Final Office Action of U.S. Appl. No. 10/337,924, Sep. 3, 2008 (mailing date), Weber, Ralph, et al.
Microsoft, Paint, 1981-2001, Software, Figs. 1-3.
Ken Stone, Authoring with iDVD 2—OS 10.1, Dec. 17, 2001, Internet: http://www.kenstone.net/fcp_homepage/basic_idvd_2.html, Retrieved: Mar. 24, 2006, pp. 1-11.
Notice of Allowance of U.S. Appl. No. 10/337,907, Oct. 1, 2009 (mailing date), Weber, Ralf, et al.
Final Office Action of U.S. Appl. No. 10/337,907, Jun. 5, 2009 (mailing date), Weber, Ralf, et al.
Portions of prosecution history for U.S. Appl. No. 10/337,924, filed Mar. 30, 2009, Weber, Ralf, et al.
Non-Final Office Action of U.S. Appl. No. 12/416,923, filed Mar. 17, 2010, Weber, Ralf, et al.

* cited by examiner

CREATING A THEME USED BY AN AUTHORING APPLICATION TO PRODUCE A MULTIMEDIA PRESENTATION

RELATED APPLICATIONS

This patent application claims benefit to and is a continuation-in-part of the United States patent application entitled "Method and Apparatus for Creating Multi-Media Presentations," having Ser. No. 10/337,924 filed on Jan. 6, 2003.

FIELD OF THE INVENTION

The invention relates to creating themes used by an authoring application to produce a multimedia presentation.

BACKGROUND OF THE INVENTION

Multimedia authoring applications allow a user to create and edit multimedia items, such as Digital Versatile Discs (DVDs), for distribution. Multimedia authoring applications also allow the user to create and edit multimedia presentations for the multimedia item, such as an interactive menu presentation for the DVD. These multimedia presentations typically include an area for presenting a movie or image and a set of selectable menu buttons. The selectable menu buttons allows a user, for example, to play a multimedia item (such as a movie) or transfer to another set of menu buttons. Interactive menus keep a viewer of the multimedia item entertained until the viewer selects one of the menu buttons.

SUMMARY OF THE INVENTION

The invention provides a method for creating a menu theme (i.e., template) for a multimedia authoring application. As used in the multimedia authoring application, the menu theme provides a basic structure for a multimedia menu presentation (such as a DVD menu presentation) that allows a user to easily create and edit the multimedia menu presentation. A theme includes one or more drop zone areas to receive and immediately present a multimedia graphic (such as a still image, set of still images, or a movie). A user selects a multimedia graphic to be presented in a drop zone area, for example, by dragging and dropping the multimedia graphic onto the drop zone area. A theme may also include an animation and/or a set of selectable menu buttons.

A menu theme is created using a menu theme description file that contains a general description of each object (such as a drop zone area, selectable menu buttons, menu title, theme background, etc.) contained in the menu theme. In addition, the menu theme description file contains a path to one or more patch files for each object in the menu theme, the patch file being used to render the object. In some embodiments, a patch file is created using a composer application that displays a graphical representation of the patch file and translates the graphical representation to a textual representation.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
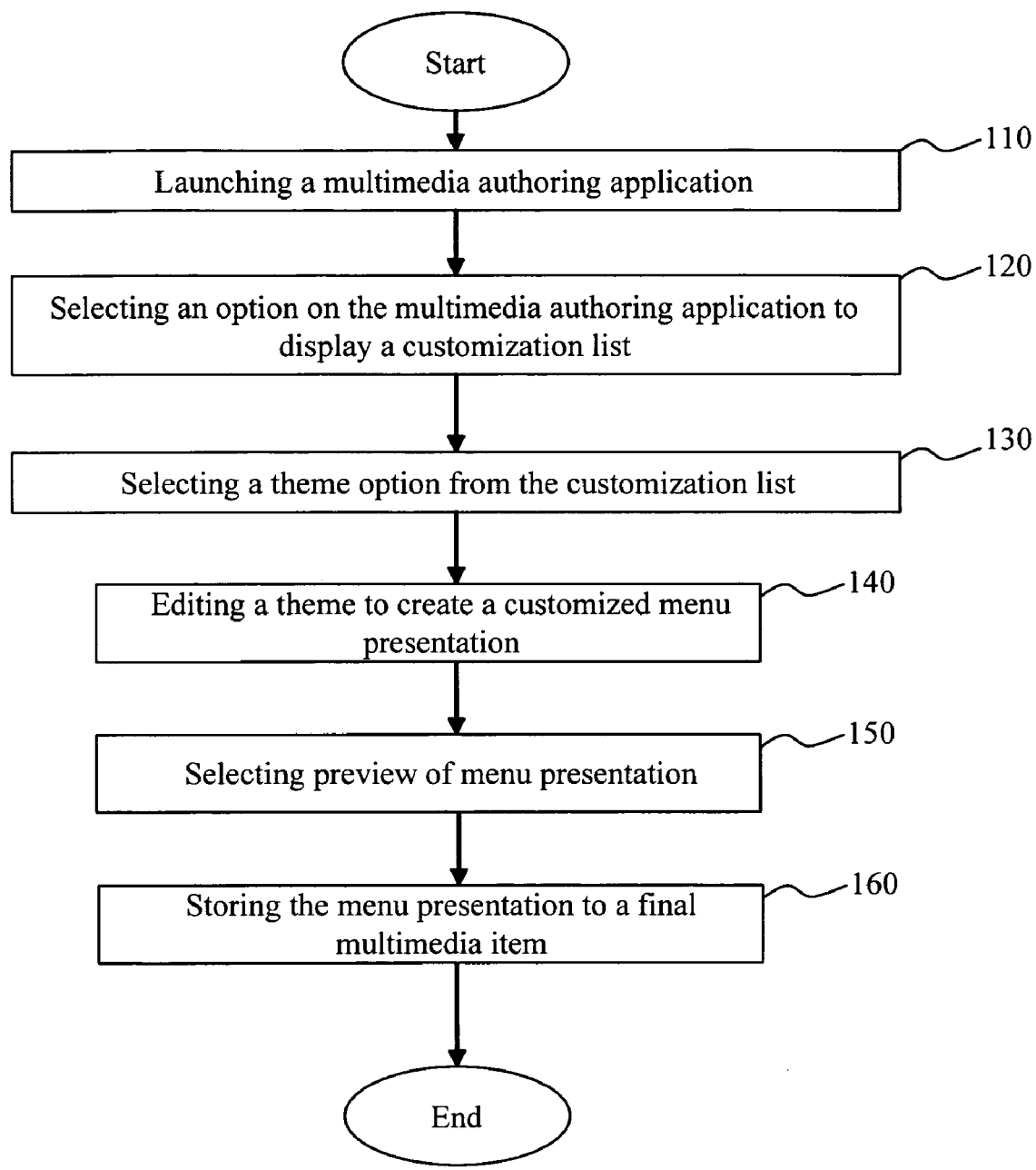
FIG. 1 illustrates a flow diagram of an example interaction between a user and the multimedia authoring application for creating and editing a multimedia menu presentation.

The disclosure of United States patent application entitled "Method and Apparatus for Creating Multi-Media Presentations," having Ser. No. 10/337,924 filed on Jan. 6, 2003, is expressly incorporated herein by reference.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Multimedia Authoring Application Overview

The present invention introduces a multimedia authoring application to create and edit multimedia items, such as Digital Versatile Discs (DVDs), for distribution. The present invention allows a user to easily create a dynamic and interactive menu presentation for the multimedia item. The multimedia authoring application allows the user to create customized menu presentations using one of many pre-designed menu "themes" that gives a basic structure for the multimedia presentation. Each menu theme is a template menu that may be customized/modified by the user.

The multimedia authoring application displays the menu theme in a display area as part of a graphical user interface ("GUI") with which a user can interact through traditional GUI operations, such as click operations (e.g., to select an item), click-and-drag operations (e.g., to move an item), etc. The multimedia authoring application allows a user to edit the menu theme, for example, by adding a multimedia graphic (such as a still image, set of still images to be displayed in a slide show, or a movie) to the menu theme through the use of a drop zone. A menu theme may includes one or more drop zone areas to receive and immediately present a multimedia graphic selected by the user. A user selects a multimedia graphic to be presented in a drop zone area, for example, by placing a cursor over the multimedia graphic and dragging and dropping the multimedia graphic onto the drop zone area using a cursor-controller device. The user may select a multimedia graphic from a list of multimedia graphics and easily import the selected multimedia graphic into the drop zone area of the menu theme. In some embodiments, a theme includes a special effect that is applied to the multimedia graphic after the multimedia graphic is selected to be presented in the drop zone area by the user.

In some embodiments, a theme further includes a set of selectable menu buttons. The set of selectable menu buttons serves as an interactive menu in the menu presentation that allows the user, for example, to begin viewing the multimedia item (e.g., a movie), advance to a specific scene in the multimedia item, navigate to submenus, view additional features, or navigate to other features. In some embodiments, a selectable menu button is comprised of two components, a text component and a multimedia graphic component (discussed below in relation to FIG. 9).

The ability to easily create and edit multimedia presentations by adding a dynamic menu presentation is advantageous. Dynamic menu presentations not only keep a user entertained at the first instance of inserting the multimedia item into a multimedia player, but also enhance the overall appearance of the multimedia item. One advantageous feature of the menu presentation is that it may provide the user with a glimpse of the multimedia content that is on multimedia item.

Example of Multimedia Authoring Application Usage

FIG. 1 illustrates a flow diagram of one possible interaction between the user and the multimedia authoring application for creating and editing a multimedia presentation. The multimedia authoring application may be executed, for example, on a computer system used by the user. Each of the steps in FIG. 1 will be further described with reference to FIGS. 2 to 8. Initially, at step 110, a user launches the multimedia authoring application, for example, by selecting a button or icon presented on a computer display.

Figure 2:
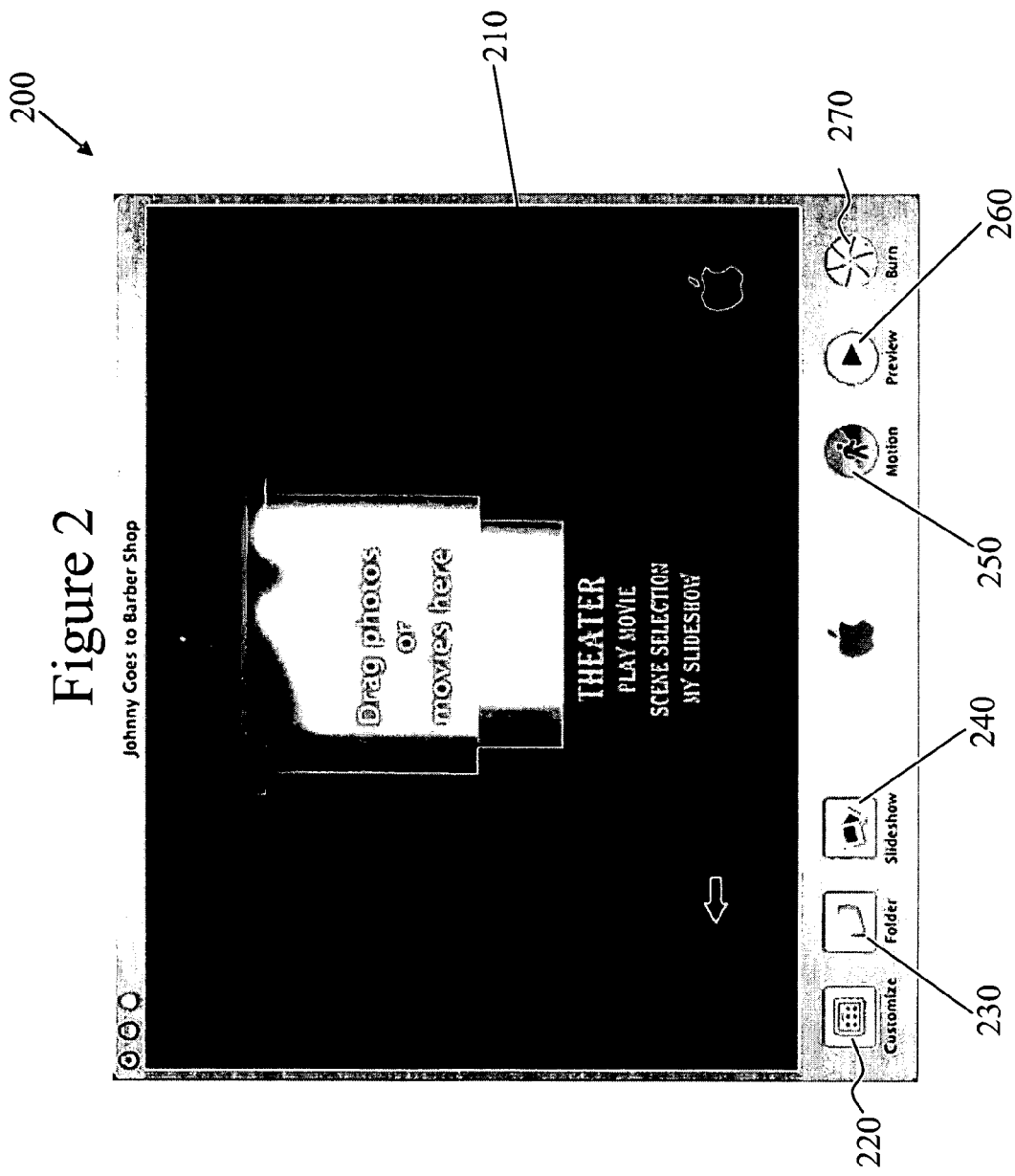
FIG. 2 illustrates a graphical user interface of the multimedia authoring application used for creating and editing multimedia menu presentations.

FIG. 2 illustrates one possible embodiment of a multimedia authoring application 200, such as a DVD multimedia authoring application for creating and editing multimedia menu presentations. The multimedia authoring application 200 includes a display area 210 and several selectable application buttons 220 to 270. The display area 210 is used by the multimedia authoring application 200 to display a menu theme that includes one or more menu theme objects (such as a drop zone area, selectable menu buttons, menu title, theme background, etc.). An object may contain a multimedia graphic such as a still image, a set of still images, or a movie. For example, the multimedia graphic may be presented in the drop zone area or in a theme background area. The display area 210 also shows any customizations made to the menu theme by the user (such as selection of a specific multimedia graphic or modification of a menu button). As such, the display area 210 displays a representation of the menu presentation that is presently being created by the multimedia authoring application 200.

In one embodiment, a default menu theme is loaded when the authoring application 200 is launched. In the example shown in FIG. 2, the default menu theme is a theatre menu theme that includes an animation of theatre curtains that open and close at predetermined time intervals.

The selectable buttons 220 to 270 of the multimedia authoring application 200 allow the user to perform various operations. A customize button 220 allows the user to customize a present menu theme or select an alternative menu theme. A folder button 230 allows the user to navigate to various folders on the user's computer for either retrieving or saving various types of data, such as the menu presentation being created for the multimedia item. A slide show button 240 allows the user to import several images for displaying in a slideshow format on the multimedia authoring application 200. A motion button 250 allows the user to toggle whether or not any movies in the menu presentation will be displayed in motion. A preview button 260 allows the user to produce a simulation of how the interactive menu will appear and operate if created. A burn button 270 allows the user to produce a final multimedia item, such as a DVD, that contains the created menu presentation.

Figure 3:
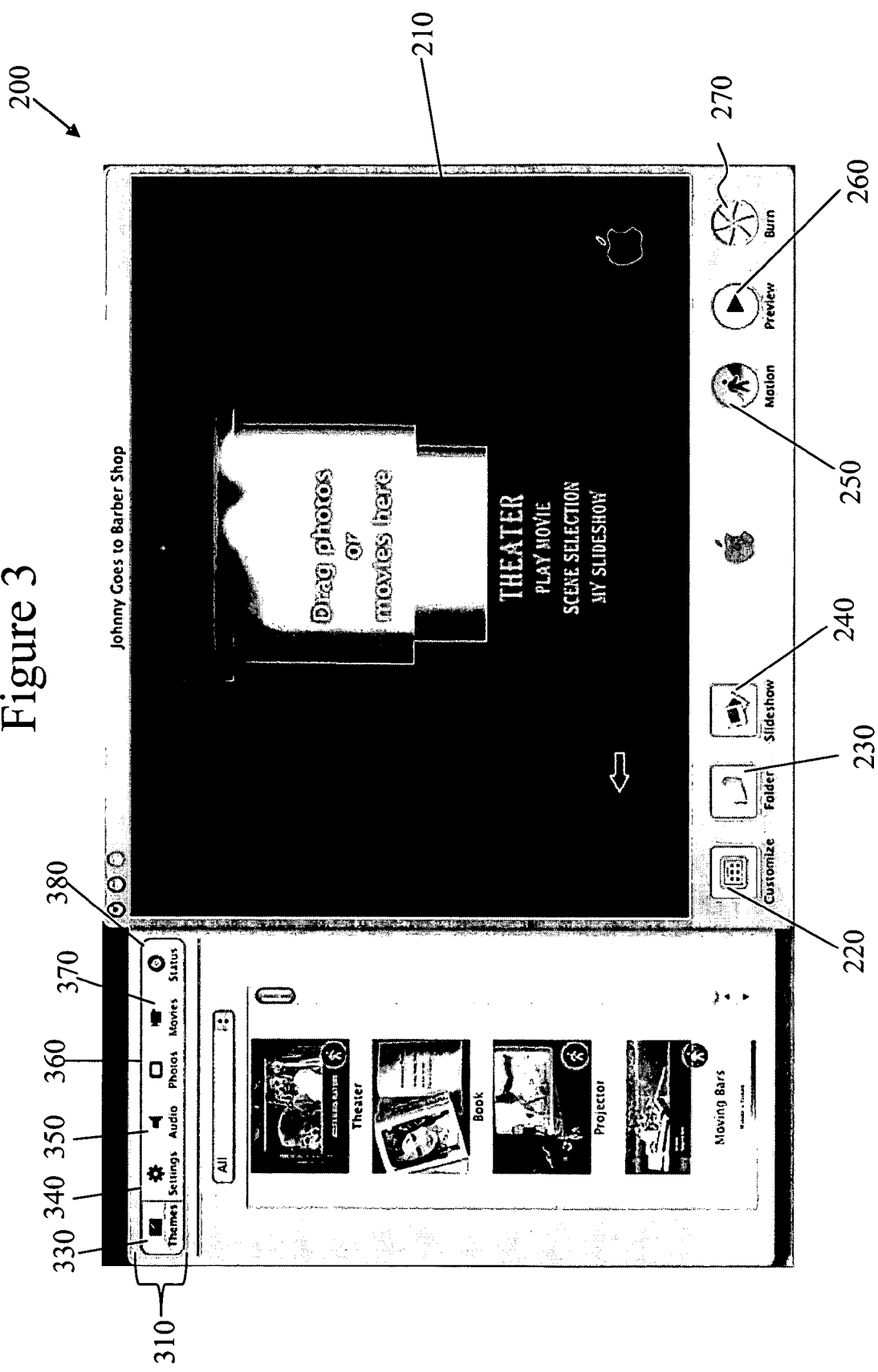
FIG. 3 illustrates the multimedia authoring application of FIG. 2 after a customize button is selected.

Referring back to FIG. 1, at step 120, the user may next select the customize button 220 to bring up a list of options for customizing the menu theme. FIG. 3 illustrates how the multimedia authoring application 200 may appear on the user's computer screen after selecting the customize button 220. As shown in FIG. 3, the customize button 220 brings up a customization list 310 that shows a number of different tool buttons 330 to 380 that may be used to customize the present menu theme or load different menu themes. The user may select a themes button 330 to bring up a library of alternative menu themes that may be selected. The user may select a settings button 340 to bring up a list of settings that may be changed to affect how the menu theme is presented. The settings list allows the user to change display area parameters, such as brightness, contrast, sharpness, etc. The user may select the audio button 350 to bring up a library of different audio clips that may be added to the menu theme. The user may select a photos button 360 to bring up a library of images that may be added to the menu theme. The user may select a movies button 370 to bring up a library of movies that may be added to the menu theme. The user may choose an item displayed in any of the above mentioned libraries or import their own menu theme, audio clip, image, or movie using the file folder button 230. The user may either store an imported item in a library or use it directly in the multimedia authoring application 200.

Figure 4:
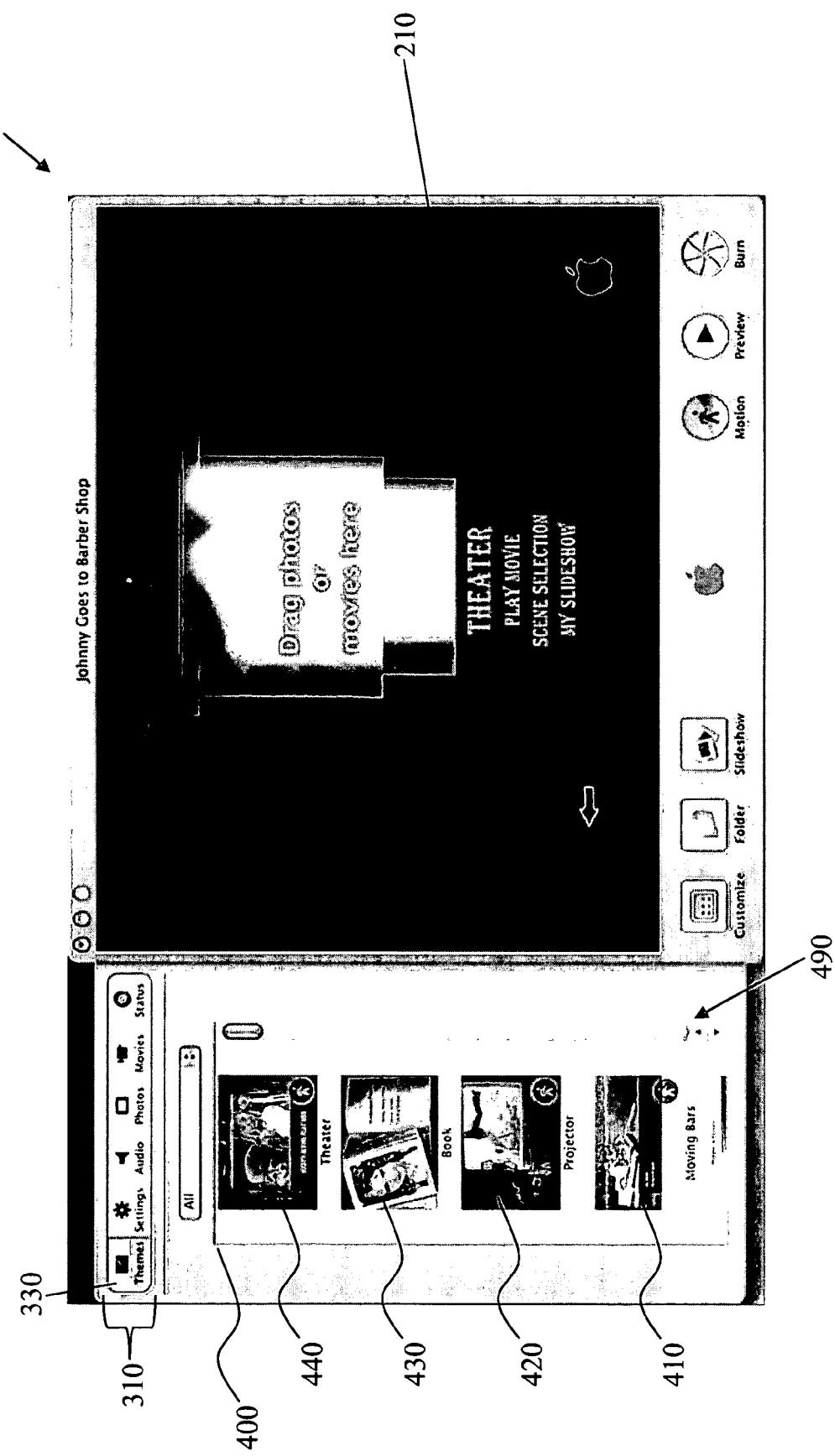
FIG. 4 illustrates a menu theme library presented in the multimedia authoring application.
Figure 5:
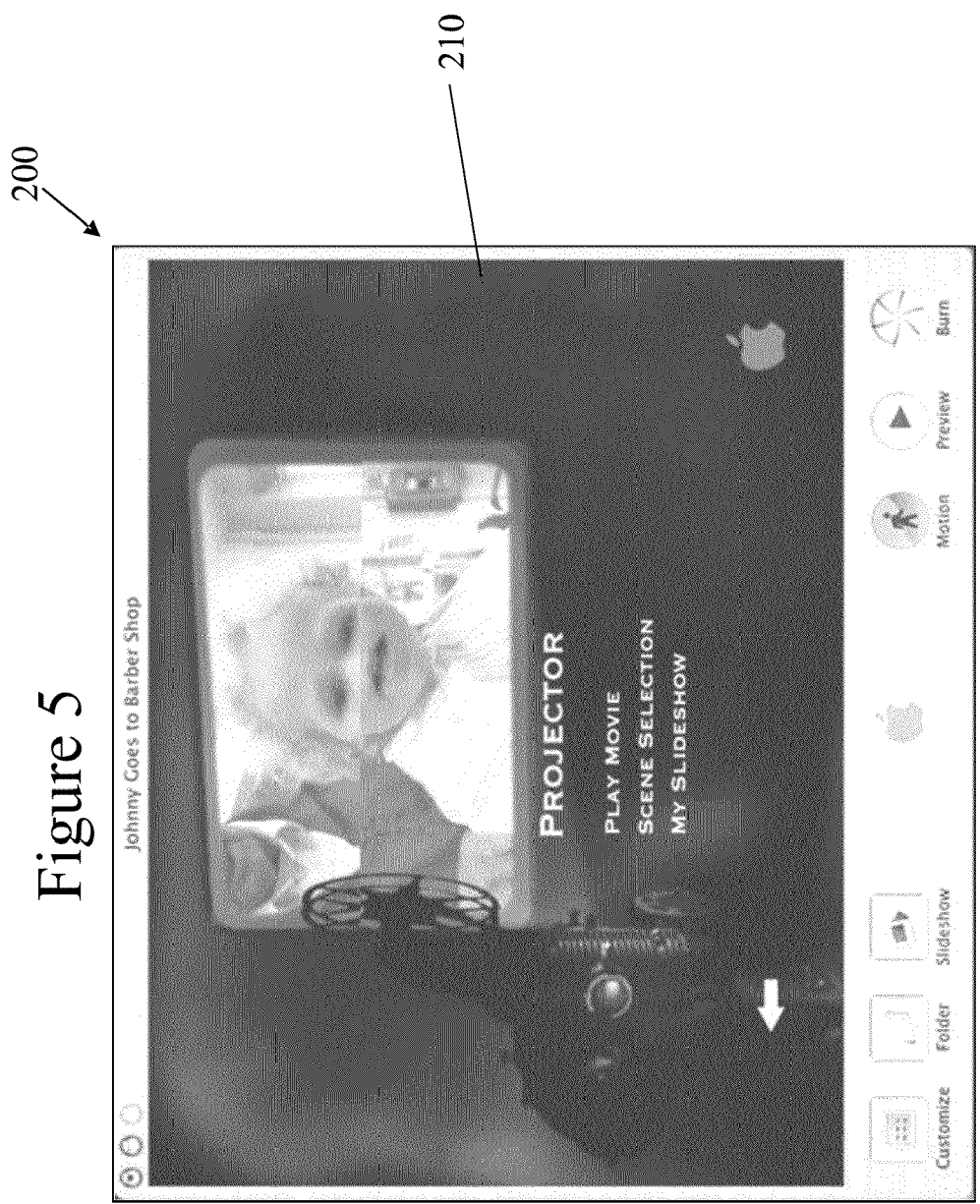
FIG. 5 illustrates an example of a projector menu theme presented in the multimedia authoring application.

Referring back to FIG. 1, at step 130 the user may select the themes button 330. Selecting the themes button 330 causes the authoring application 200 to display a library of alternative menu themes in an item display area 400, as shown in FIG. 4. The menu theme library includes one or more menu themes 410 to 440. A user may select any of the menu themes 410 to 440 displayed in the menu theme library or store other menu themes into the menu theme library for later use. In the example shown in FIG. 4, four menu themes 410 to 440 are displayed within the item display area 400. Additional menu themes may be accessed by scrolling down the item display area 400 using a scroll bar 490. When a user selects a menu theme 410 to 440, the multimedia authoring application 200 highlights the selected menu theme in the item display area 400 indicting the selection and displays the selected menu theme in display area 210. For example, if the user selects a projector menu theme 420, it is displayed in the display area 210 of the multimedia authoring application 200, as shown in FIG. 5.

Customizing a Menu Theme

Figure 6:
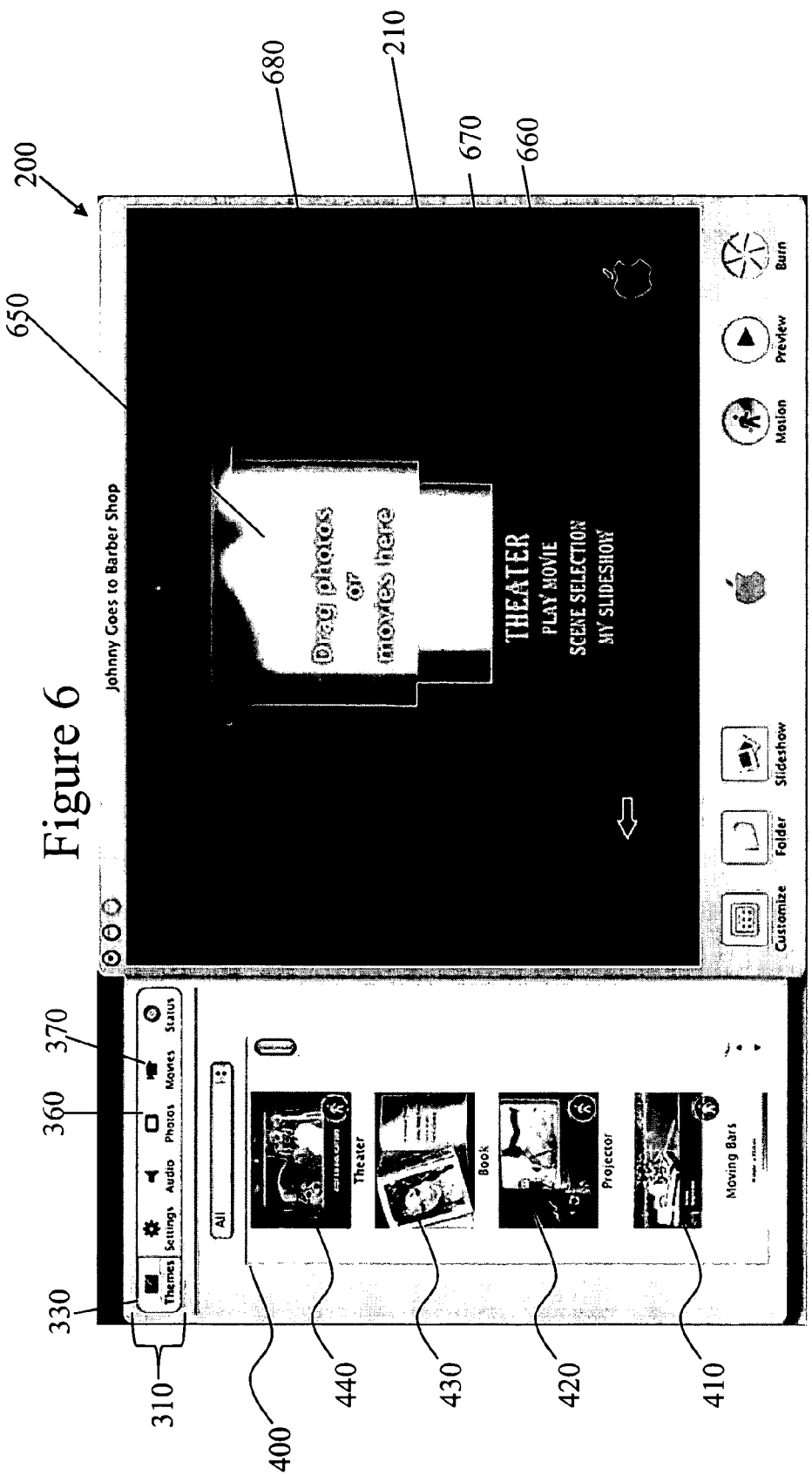
FIG. 6 illustrates menu theme objects of a theatre menu theme.

FIG. 6 shows a menu theme that includes a plurality of menu theme objects including a 'drop zone' area 650, a set of selectable menu buttons 660, a menu title 670 (e.g., "Theater"), and a theme background 680. A user may edit a menu theme by selecting a multimedia graphic to be displayed in the drop zone area. For example, a user may click and drag a still image, a set of still images, a movie, or any combination of the three onto the drop zone area. In some embodiments, if a still image is selected to be presented in the drop zone area, the still image will be displayed in the drop zone area. If a set of still images is selected, the still images will be displayed sequentially in a slideshow format. If a movie is selected, a predetermined number of seconds of the movie will be displayed in the drop zone area in a looped manner. The user may also select a combination of multimedia graphics to be displayed in the drop zone area. For example, a user may select an image and a then movie to be displayed in the drop zone area in a looped manner. In some embodiments, when a multimedia graphic is "dragged" over the drop zone area by the user, a "highlighted" drop zone area is displayed. For example, the drop zone area may be shown with a bright yellow border.

After a multimedia graphic is selected to be displayed in the drop zone area, the multimedia graphic is immediately displayed in the drop zone area to give the user a representation of how the menu presentation would appear to a viewer of the multimedia presentation. By providing a 'real-time' representation of the menu presentation, the authoring application 200 allows the user to quickly and easily determine how the menu presentation would appear to a viewer and if other customizations to the menu presentation are needed (for example, if the selected multimedia graphic does not give the desired look to the menu presentation).

Figure 7:
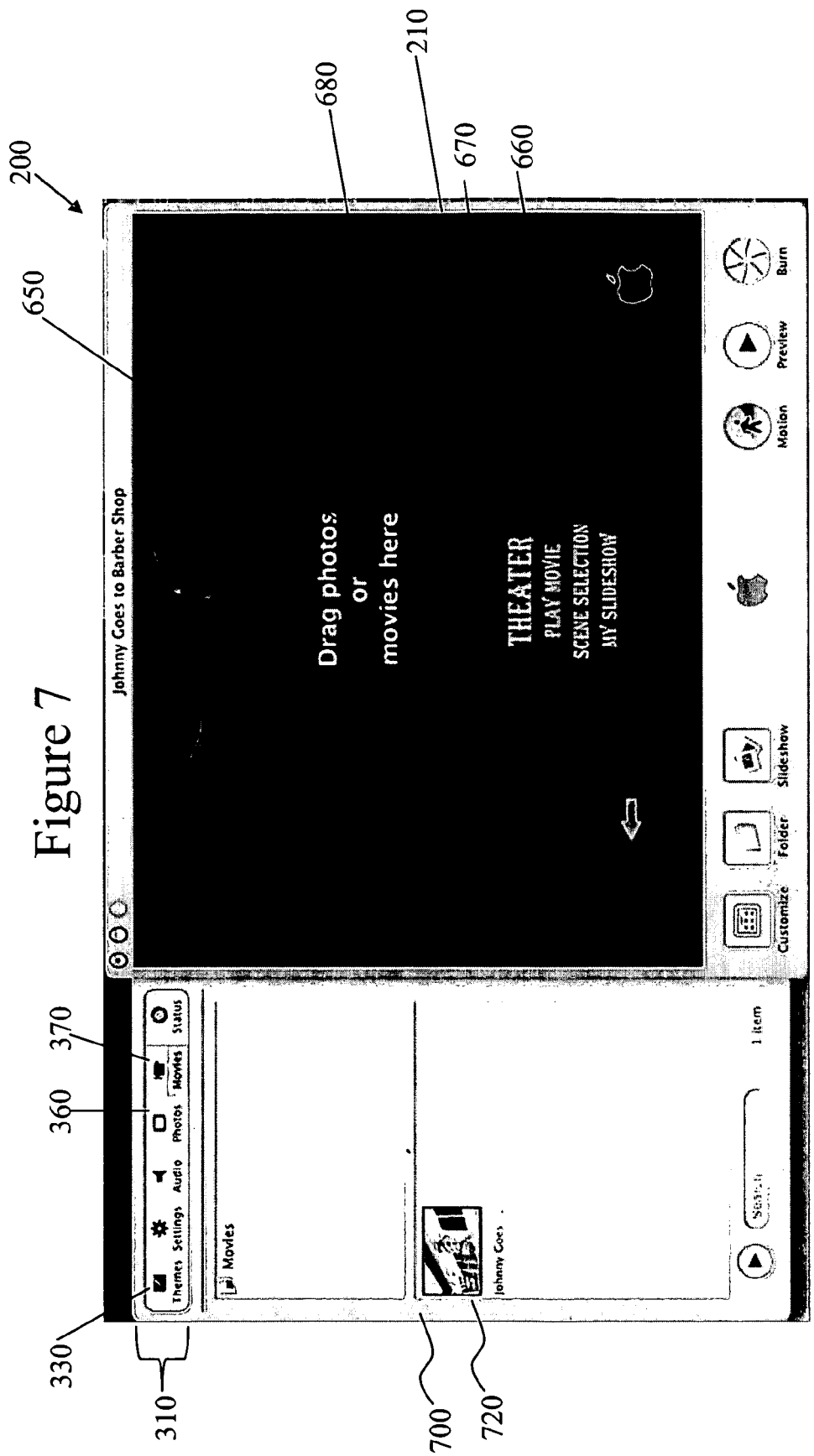
FIG. 7 illustrates a library of movies presented in the multimedia authoring application.

Referring back to FIG. 1, at step 140 the user may edit the menu theme to create a customized menu presentation. The user may, for example, select a movies button 370 to bring up a library of movies 700, as illustrated in FIG. 7. A movie from the library of movies may then be selected for presentation in the drop zone area 650. In the example shown in FIG. 7, the movies library 700 contains one selectable movie 720 ("Johnny Goes to Barber Shop"), although more movies may be displayed in movies library 700. A user may select the movie 720 for presentation in the drop zone area 650, for example, by dragging and dropping the movie 720 onto the drop zone area 650.

To edit a menu theme, a user may also select a photos button 360 to bring up a library of images. One or more images from the library of images may then be selected for presentation in the drop zone area 650. If more than one image is selected, the images will be displayed in a slideshow format where the selected images will be displayed in sequential order in a loop manner.

A menu theme may contain one or more animations. In some embodiments, an animation file is a movie, for example, in QuickTime™ format. The example of FIG. 6 shows a theatre menu theme that includes an animation of theatre curtains that open and close at predetermined time intervals. In some embodiments, the curtain animation is produced by creating a 'curtain' movie of opening and closing theatre curtains. The 'curtain' movie is over laid on top of drop zone area 650 where the 'curtain' movie is set to an opaque setting in an alpha channel while any multimedia graphic in the drop zone area 650 is set to a transparent setting in the alpha channel. The animation of the theatre menu theme will then show theatre curtains opening and closing at predetermined time intervals over a multimedia graphic displayed in the drop zone area 650.

Figure 8:
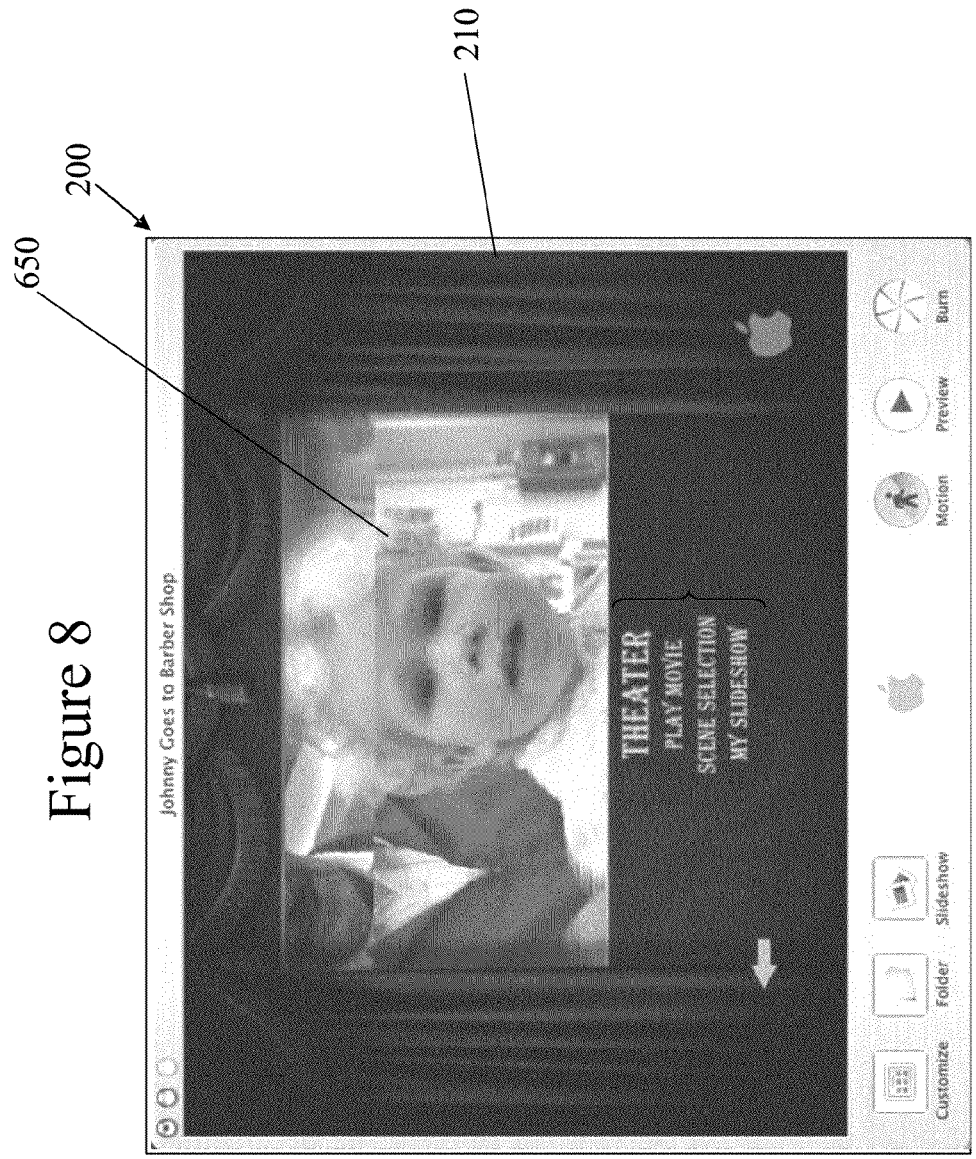
FIG. 8 illustrates the results of dropping a movie in the drop zone of the theatre menu theme.

FIG. 8 illustrates how the theatre menu theme may appear after the movie 720 ("Johnny Goes to Barber Shop") has been dropped onto the drop zone area 650. The time duration of the movie that is to be played in a looped manner can be specified by the user. For example, if the animated curtains open and close every 30 seconds, the user can synchronize the movie in the drop zone area with the animated curtains by specifying that 30 seconds of the movie is to be played in a looped manner. Note that in FIG. 7, the animated curtains are in a closed position since the curtains are continually animated.

A menu theme also includes a set of selectable menu buttons 660. The user may add or delete a selectable menu button 660 or modify a selectable menu button 660. For example, the user may modify the text, shape, or multimedia graphic of the selectable menu button.

Referring back to FIG. 1, at step 150 the user may select a preview button 260 to produce a simulation of how the interactive menu presentation will appear and operate if created. At step 160 the user may select a burn button 270 to store the menu presentation to a final multimedia item, such as a DVD. When storing the menu presentation to a final multimedia item, the menu presentation must be stored taking into consideration applicable standards of the industry, such as DVD standardized limitations.

In some embodiments, upon selecting the burn button 270, all of the objects that define the menu presentation are rendered (composited) and a single movie (e.g., MPEG video and audio) is created and stored to the final multimedia item. Typically, the created movie has no interaction capabilities except through the selectable menu buttons. For the set of selectable menu buttons, an overlay layer is also rendered to produce an interactive function for the set of selectable menu buttons, each selectable menu button being a sub-area of the overlay layer.

As presented in the final multimedia item, a selectable menu button 660 allows a viewer, for example, to begin viewing a multimedia item, advance to a specific scene in the multimedia item, display a slideshow, navigate to submenus, view additional features, or navigate to other features. A selectable menu button 660 may be linked to submenus where each submenu may be created through use of a menu theme as well. For example, if the user selects the "Scene Selection" menu button from the selectable menu 660, a scenes submenu may be displayed.

Figure 9:
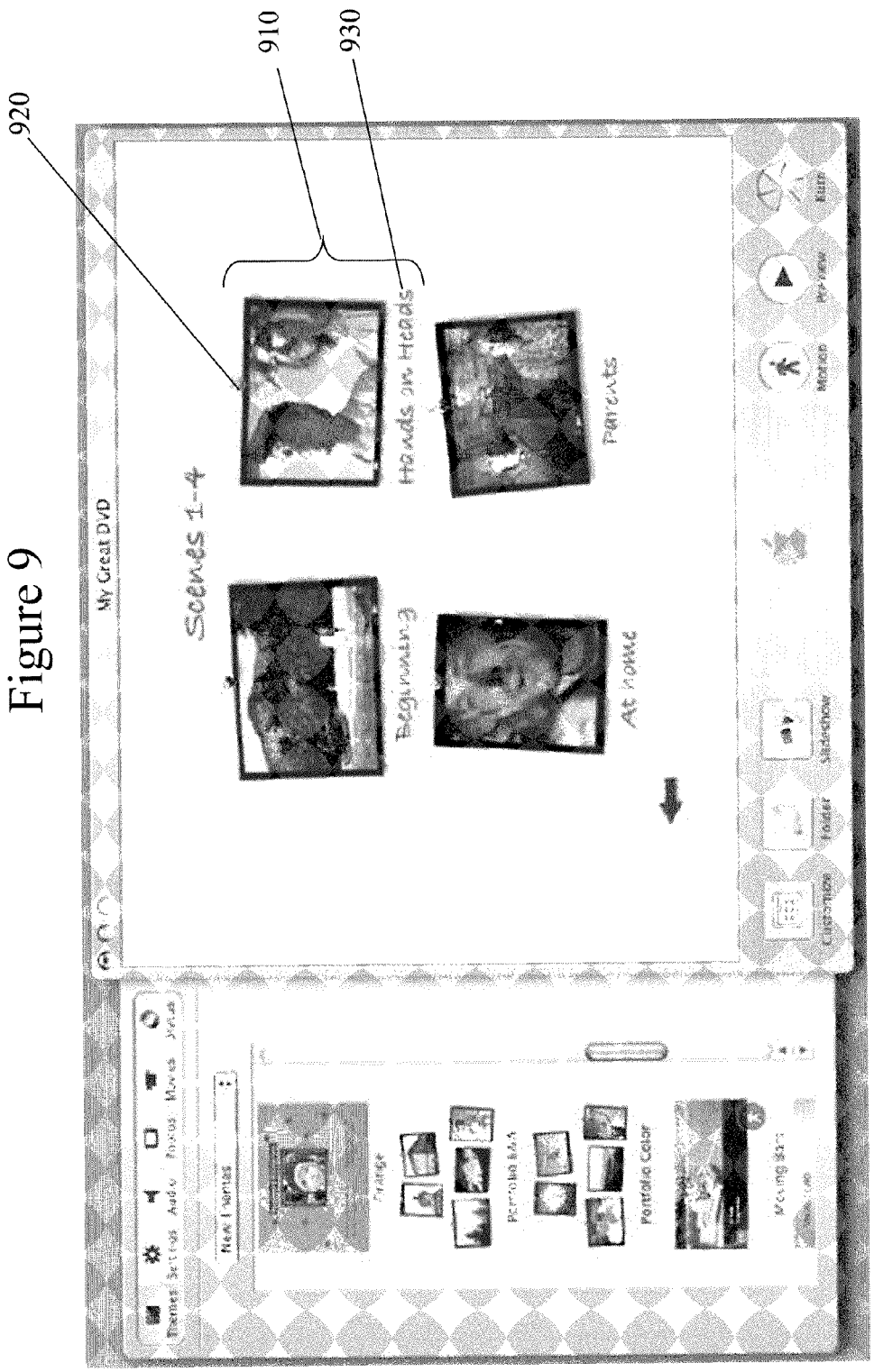
FIG. 9 illustrates a scene submenu that displays particular scenes that may be selected.

FIG. 9 illustrates an example of a scene submenu that displays particular scenes that may be selected. The scene submenu shown in FIG. 9 includes four selectable menu buttons 910 where each selectable menu button 910 is comprised of two components, a text component 930 and a multimedia graphic component 920. In some embodiments, one or both components 920 and 930 of the selectable menu button 910 are selectable (i.e., interactive). In some embodiments, the multimedia graphic component 920 is comprised of a drop zone area where a user may select a multimedia graphic to be presented in the multimedia graphic component 920 by "dropping" the multimedia graphic into the multimedia graphic component 920.

Multimedia Authoring Application Environment

Figure 10:
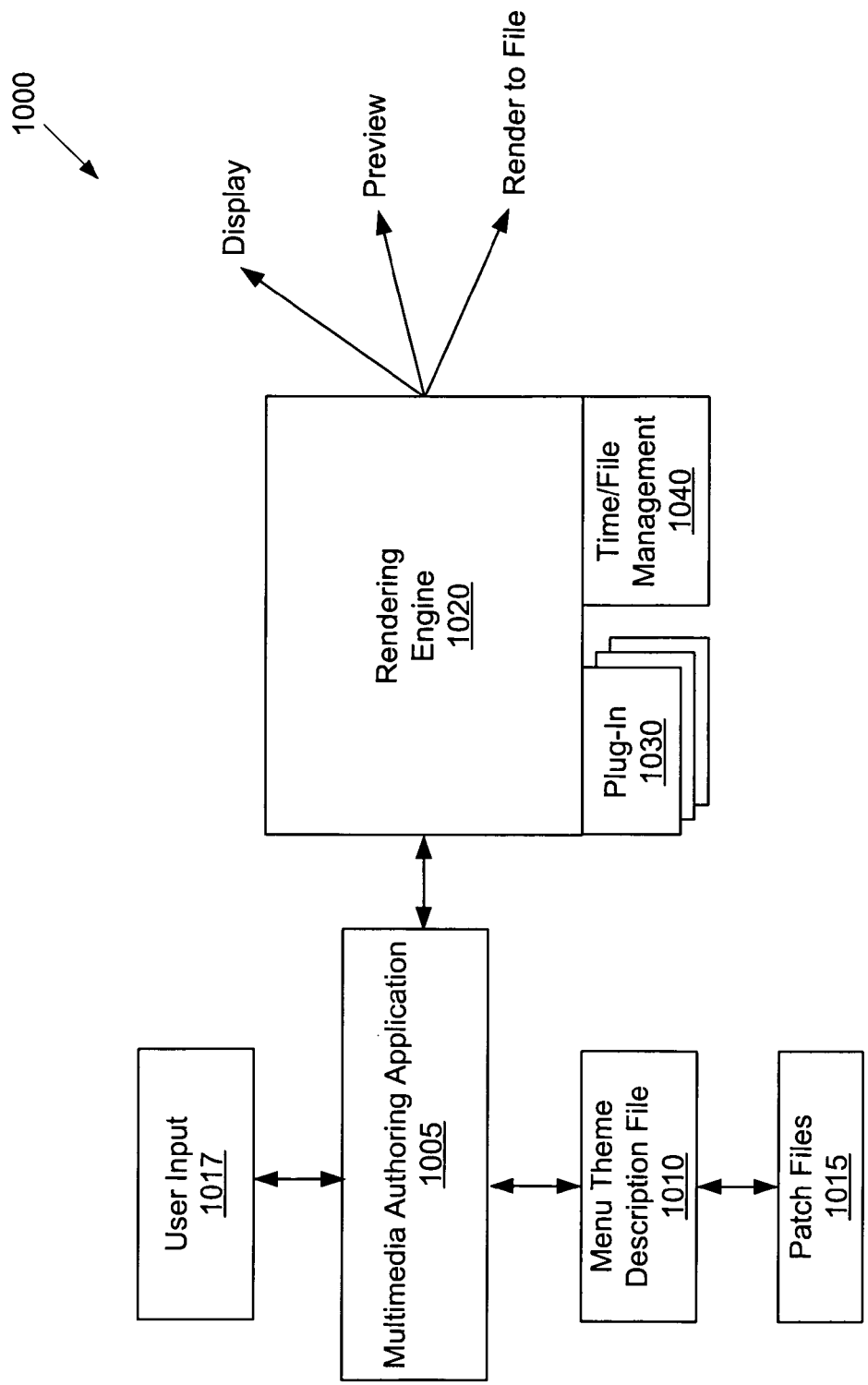
FIG. 10 illustrates a conceptual diagram of an operating environment of the multimedia authoring application.

FIG. 10 illustrates a conceptual diagram of an operating environment 1000 of the multimedia authoring application 1005. The multimedia authoring application 1005 receives a menu theme description file 1010 and user input 1017 and interacts with a rendering engine 1020 to produce a display, preview, or rendering to a file of the menu presentation. A display of the menu presentation is presented during editing of the menu presentation by a user (comprising the user input 1017) through the multimedia authoring application 1005, the display showing the results of the user customizations. As such, the user input 1017, multimedia authoring application 1005, and the rendering engine 1020 compose a feedback loop used to customize a menu presentation. A preview of a menu presentation shows a simulation of how the interactive menu will look and operate if created. A rendering to a file allows the menu presentation to be stored to a file (for example, to produce a final multimedia item, such as a DVD). Note that in the preview and rendering modes, the resulting menu presentation can not be edited by the user since the menu presentation only contains "play" interactive features in these modes.

The menu theme description file 1010 is a description of a menu theme that contains a general description of each object (such as a drop zone area, selectable menu buttons, menu title, theme background, etc.) contained in the menu theme. General properties for each object are described in the menu theme description file 1010, such as position in the menu theme, size, alignment, etc. For example, for a menu title, the general properties may include font, size, color, etc.

Of particular interest in the menu theme description file 1010 is the description of the drop zone area. Each menu theme can have an arbitrary number of drop zone areas (1 to N). Each drop zone area is defined in the menu theme description file 1010 by several properties. Examples of these properties are position, area size (defined by a bounding box), orientation, an alpha value (that specifies a transparency level of a multimedia graphic presented in the drop zone area), and a Z-level (that specifies the depth of the drop zone area).

In addition, the menu theme description file 1010 contains a path to one or more patch files 1015 for each object in the menu theme, the patch file(s) being used to render the object. The general properties of an object described in the menu theme description file 1010 is used in conjunction with a patch file 1015 for the object by the rendering engine 1020 to render the object.

The patch file(s) associated with an object contains a description of modules having specific functions that are needed to render the object. The rendering engine 1020 reads and determines a specific function called for by a module in a patch file and calls and executes a plug-in program 1030 (discussed below) capable of performing the specific function. Typically, the menu theme description file 1010 contains a path to one patch file 1015 for each object in the menu theme. In some embodiments, however, for an object having two or more components (such as the selectable menu buttons 910 shown in FIG. 9), the menu theme description file 1010 contains a path to a patch file 1015 for each component of the object. In the case where an object has two or more components, a patch file is needed to render each component.

A patch file can be seen as having a low level description of an object that is concerned primarily with the description needed to render the object. In contrast, the menu theme description file 1010 contains a higher level description of an object and contains a description of the general properties of the object. In some embodiments, the menu theme description file 1010 and the patch files 1015 are Extensible Markup Language (XML) files.

The menu theme description file 1010 may also be part of a menu theme bundle (i.e., a folder of files) that contains "content" files (such as a file containing a default multimedia graphic) to be displayed in objects of the menu theme. If a default multimedia graphic is to be displayed in a particular object, the menu theme description file 1010 sends to a patch file (used to render the particular object), a path to the default multimedia graphic.

A patch file 1015 may also be part of a patch bundle (i.e., a folder of files) that contains "content" files containing, e.g., default multimedia graphics or animations to be displayed in an object of the menu theme when the menu theme is initially displayed. In some embodiments, the patch bundle is a sub-folder of the menu theme bundle. These default multimedia graphics or animations are used by the patch file 1015 to render the object.

A menu presentation is produced by the rendering engine 1020 using the general description of the menu theme in the menu theme description file 1010, customizations/edits made by a user (user input 1017) through the multimedia authoring application 1005, and the patch files 1015 referred to in the menu theme description file 1010. To render a particular object of a menu theme, the rendering engine 1020 loads and reads the patch file 1015 specified for the particular object in the menu theme description file 1010.

To render the menu theme, the rendering engine 1020 may use one or more plug-ins 1030, a plug-in 1030 being a program that implements a specific operation required by the menu theme description file 1010 or a module in a patch file 1015. For example, a plug-in 1030 may be used to import a multimedia graphic or text into the rendering engine 1020 or to implement a special effect (e.g., sepia tone, filtering, etc.) on an imported multimedia graphic, as called for by the menu theme description file 1010 or a patch file 1015. A plug-in is called (invoked) and executed by the rendering engine 1020 when needed. The rendering engine 1020 also uses a time/file program 1040 that manages resources required by the plug-ins 1030 (such as memory space, processor time, etc.).

Multimedia Authoring Application Architecture

Figure 11:
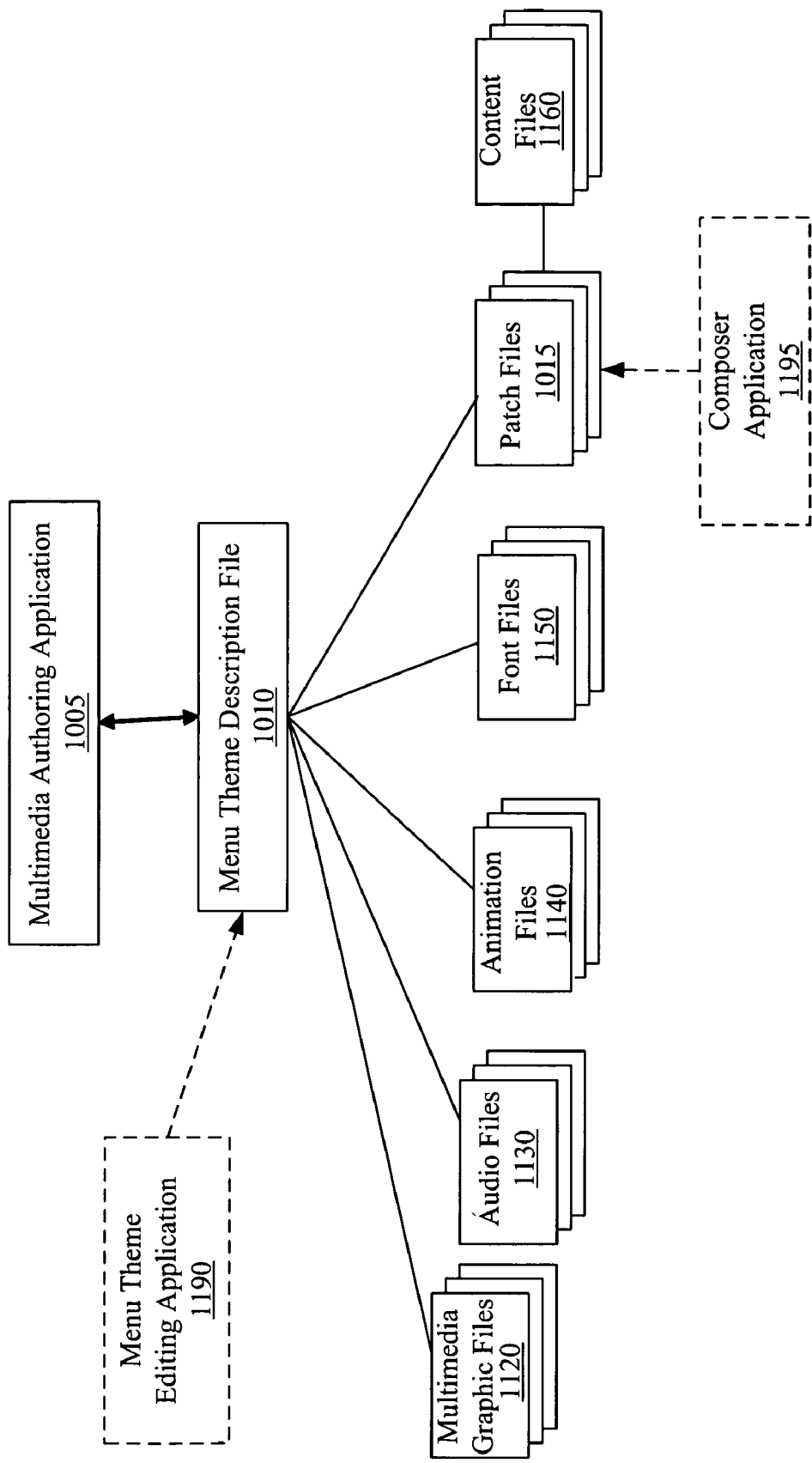
FIG. 11 illustrates a conceptual diagram of the architecture of a multimedia authoring application.

FIG. 11 illustrates a conceptual diagram of the architecture of a multimedia authoring application 1005. The multimedia authoring application 1005 loads and reads a menu theme description file 1010 that describes a menu theme and contains general properties for each menu theme object to describe how a menu theme will appear. In some embodiments, the menu theme description file 1010 is created with a menu theme editing application 1190 that is similar to an XML editing program.

The menu theme description file 1010 also refers to other files (called "referred files") to render objects of the menu theme. A referred file, for example, may be a "content" file having data of a multimedia graphic, animation movie, audio clip, etc. or may be a patch file 1015 containing a description of an arrangement of modules. In some embodiments, the menu theme description file 1010 refers to one or more of the following "content" files: a graphic file 1120, audio file 1130, animation file 1140, and font file 1150. A graphic file 1120 contains a multimedia graphic that may be presented, for example, in the theme background area or the drop zone area of a menu theme. An audio file 1130 contains an audio clip that is played in a looped manner while a menu theme is displayed. An animation file 1140 includes an animation (e.g., opening and closing theatre curtains) associated with the menu theme. A font file 1150 is used to render selectable menu buttons and menu title of a menu theme. The menu theme description file 1010 may be contained in a menu theme bundle that also contains one or more of the "content" files. Typically, the "content" files contained in a menu theme bundle are able to be customized/changed by the user through the multimedia authoring application 1005.

The menu theme description file 1010 contains a path to one or more patch files 1015 for each object (such as a drop zone area, selectable menu buttons, menu title, theme background, etc.) to be rendered in the menu theme. A patch file 1015 contains a description of a menu theme object that is read by the rendering engine 1020 to render the object. One or more patch files may be used to produce, for example, a selectable menu button or a drop zone area. In some embodiments, a patch file 1015 is created by a composer application 1195 (discussed below in relation to FIG. 14) that displays a graphical representation of the patch file and translates the graphical representation to a textual representation (e.g., XML representation) that describes an arrangement of modules.

A patch file 1015 may also refer to one or more "content" files 1160 (discussed above) to render an object of the menu theme, such as a highlight multimedia graphic (that is displayed in the drop zone area when, for example, the user drags a multimedia graphic over the drop zone area) or an animation file. A patch file 1015 may be contained in a patch bundle that also contains one or more of the "content" files. Typically, the "content" files contained in the patch bundle are not able to be customized/changed by the user through the multimedia authoring application 1005. In some embodiments, the patch bundle is a sub-folder of the menu theme bundle.

Rendering Engine Operations

Figure 12:
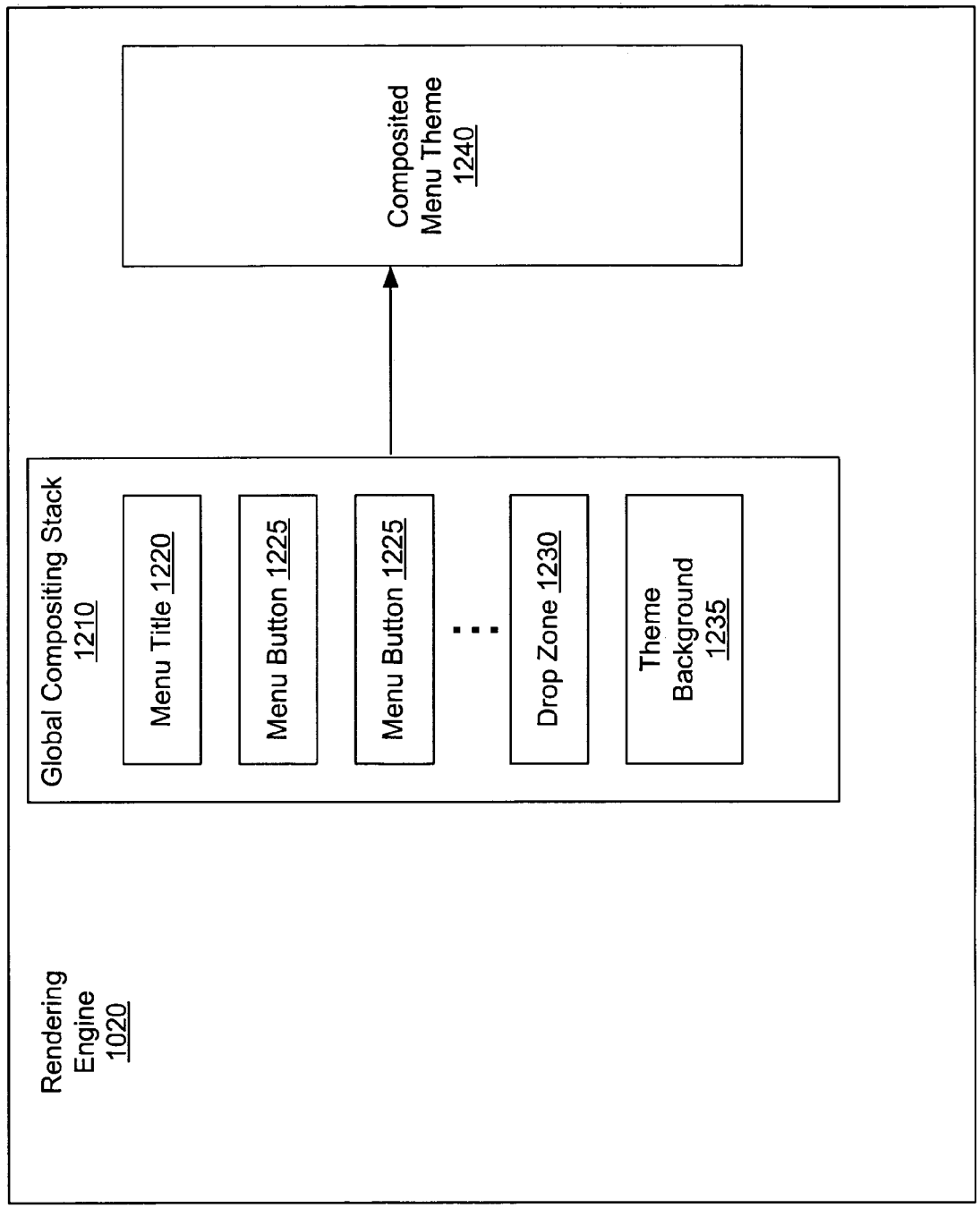
FIG. 12 illustrates a conceptual diagram of the operations performed by the rendering engine to produce a composited menu theme.

FIG. 12 illustrates a conceptual diagram of the operations performed by the rendering engine 1020 to produce a composited (rendered) menu theme 1240. To produce the menu theme 1240, the rendering engine 1020 uses a global compositing stack (object hierarchy) 1210 that contains layers of objects from a top layer object to a bottom layer object.

The ordering of object layers in the global compositing stack 1210 is specified by the general description of the menu theme in the menu theme description file 1010. The menu theme description file 1010 also contains, for each object layer in the global compositing stack 1210, a path to a patch file needed to render the object layer. The multimedia authoring application 1005 reads the menu theme description file 1010 and sends the ordering of object layers and associated patch file paths to the rendering engine 1020. As each patch file is received by the rendering engine 1020, an object layer is created in the global compositing stack 1210. The rendering engine 1020 then composites the objects accordingly to produce the rendered menu theme 1240.

The rendering engine 1020 renders objects starting from the bottom layer to the top layer so that objects on upper layers are displayed on top of objects on lower layers (i.e., an object layer above a lower object layer in the object hierarchy is rendered as opaque while the lower object layer is rendered as transparent when both object layers occupy the same area in the menu theme). To render each object in the object hierarchy, the rendering engine 1020 reads the patch file for the object and uses a separate compositing stack for each object.

In the example shown in FIG. 12, the global compositing stack 1210 contains a plurality of object layers including a menu title 1220 (at the top layer), a plurality of selectable menu buttons 1225, a drop zone area 1230, and a theme background 1235 (at the bottom layer). As such, to produce the composited menu theme 1240, the rendering engine 1020 must first render each object layer starting from the bottom layer (the theme background 1235) to the top layer (the menu title 1220) using separate compositing stacks for each object layer.

Figure 13:
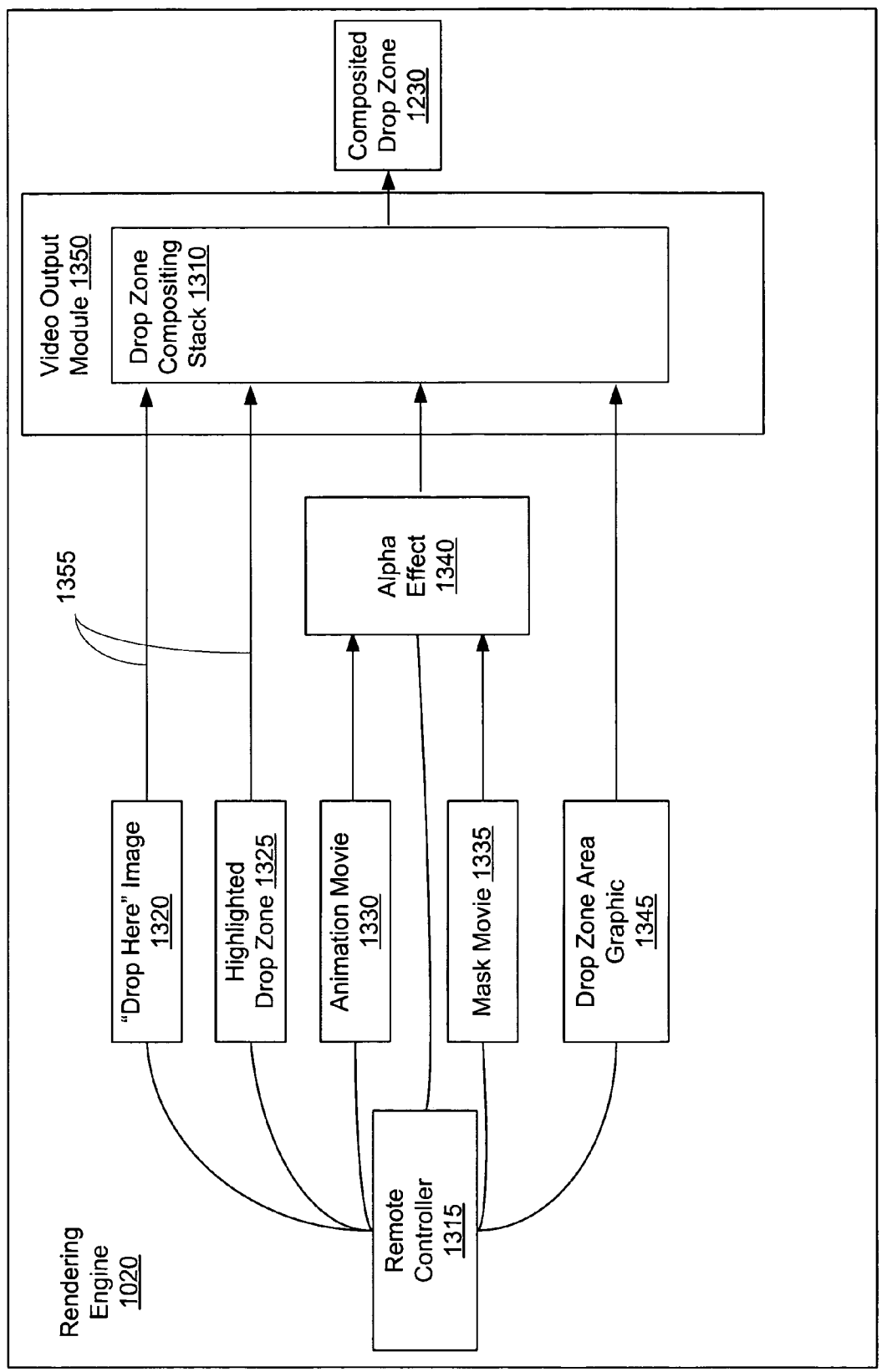
FIG. 13 illustrates a conceptual diagram of the operations performed by the rendering engine to produce an exemplary drop zone object.

FIG. 13 illustrates a conceptual diagram of the operations performed by the rendering engine 1020 to produce an exemplary drop zone object 1230. The drop zone area 650 of FIG. 6 is an example of such a drop zone object. The rendering engine 1020 produces the drop zone object 1230 using the patch file for the drop zone (received from the multimedia authoring application 1005). The drop zone patch file describes an arrangement of modules. In the example shown in FIG. 13, these modules include a remote controller module 1315, a plurality of image importers ("Drop Here" image 1320, highlighted drop zone image 1325, animation movie 1330, mask movie 1335, and drop zone area graphic 1345), a special effect module 1340, and a video output module 1350.

Each image importer (i.e., multimedia graphic importer) represents a communication port with the multimedia authoring application 1005 where a multimedia graphic is received from the multimedia authoring application 1005 and imported into the patch file for processing by the rendering engine 1020 (according to the description in the patch file). A file containing the multimedia graphic may be contained in a menu theme bundle or a patch bundle created for the drop zone. A text importer (not shown) provides the same function as an image importer but imports text rather than a multimedia graphic.

For example, the "Drop Here" image 1320 may import an image showing the text "Drag photos or movies here," as shown in the drop zone area 650 of FIG. 6. The highlighted drop zone image 1325 may import an image to indicate that the drop zone area is "highlighted" (for example, a bright yellow border) that is activated when the user has "dragged" a multimedia graphic over the drop zone area. The animation movie 1330 may import a movie of opening and closing theatre curtains and the mask movie 1335 may import a movie that is a mask of the animation movie. The highlighted drop zone image and animation and mask movies may be contained, for example, in a patch bundle that contains the drop zone patch file. The drop zone area graphic 1345 may import from the multimedia authoring application 1005, a default multimedia graphic (such as a graphic of a white box) or a multimedia graphic that has been later selected by the user to be presented in the drop zone area. The default multimedia graphic may be contained, for example, in the menu theme bundle.

Each image importer produces a data stream of pixels 1355. In the example shown in FIG. 13, the data streams produced by the animation movie 1330 and mask movie 1335 importers are received by a special effect module (alpha effect 1340). The alpha effect 1340 combines the data streams from the animation movie 1330 and the mask movie 1335 which gives the animation movie a transparency mask that is then superimposed on top of a multimedia graphic imported to the drop zone area. For example, this may produce an animation of theatre curtains that open and close in front of the imported multimedia graphic.

To render the composited drop zone 1230, the video output module 1350 internally creates a drop zone compositing stack 1310 that receives data streams 1355 from modules described in the drop zone patch file (such as the image importers or special effect modules). The video output module 1350 then composites the received data streams of pixels 1355 and produces a composited drop zone 1230. In the example shown in FIG. 13, the drop zone compositing stack 1310 receives four data streams 1355 where each data stream 1355 comprises a layer of the object (the drop zone area) to be rendered.

Each module described in the drop zone patch file and each object layer of the drop zone compositing stack 1310 is controlled through use of the remote controller 1315 that receives instructions from the multimedia authoring application 1005. Through the remote controller 1315, the multimedia authoring application 1005 may control, for example, when a module or layer is activated and when it is not activated. This allows, for example, particular modules or layers to be applied depending on user interaction with the multimedia authoring application 1005.

For example, the multimedia authoring application 1005 (through the remote controller) may activate the "Drop Here" image 1320 layer so that the "Drop Here" image 1320 is displayed in the drop zone area when the multimedia authoring application 1005 is initially launched. The multimedia authoring application 1005 may then activate the highlighted drop zone image 1325 layer when a multimedia graphic is "dragged" over the drop zone area by the user. As such, the highlighted drop zone image 1325 layer would then be displayed on top of the multimedia graphic shown in the drop zone area. As a further example, after a multimedia graphic is "dropped" to the drop zone area by the user, the multimedia authoring application 1005 (through the remote controller) may de-activate the highlighted drop zone image 1325 layer. The remote controller 1315 can also activate or de-activate other modules such as special effect modules.

The rendering engine 1020 then composites the layers in the drop zone compositing stack 1310 to produce the drop zone object 1230. The drop zone object 1230 is then sent to the global compositing stack 1210 where it is composited with other objects to produce the composited menu theme 1240.

Creating Patch Files Using a Composer Application

Figure 14:
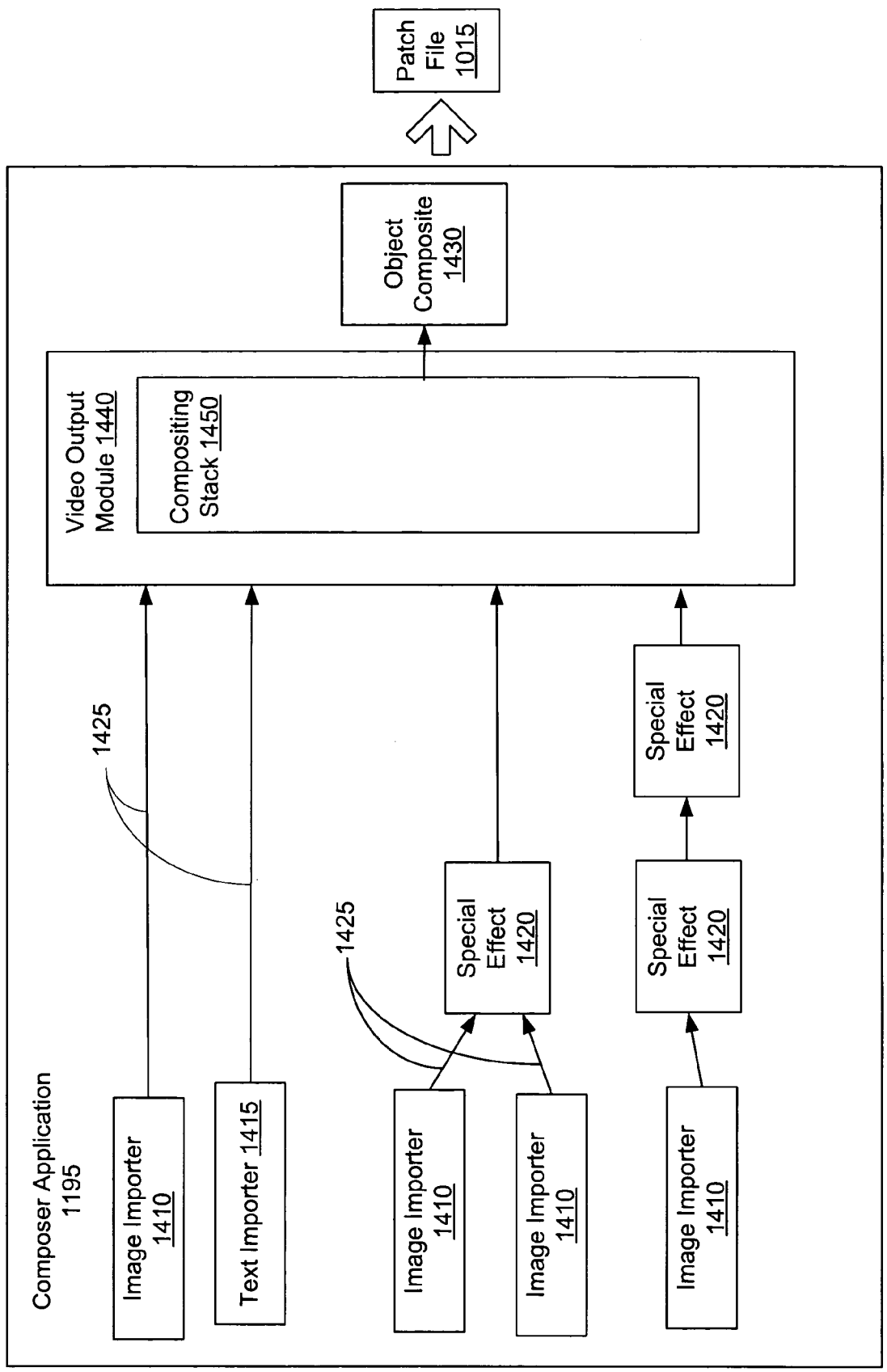
FIG. 14 shows a conceptual diagram of the operations of a composer application used to create a patch file for an object in some embodiments.

FIG. 14 shows a conceptual diagram of the operations of a composer application 1195 used to create a patch file 1015 for an object in some embodiments. The composer application 1195 is a graphical user interface application that displays a graphical representation of the object in a menu theme and translates the graphical representation to a textual representation (patch file) of the object. In some embodiments, the textual representation of the object is XML representation. The graphical representation is created by a user who interacts with the composer application 1195 through the graphical user interface.

An example of a graphical representation of an object is shown in FIG. 14. The graphical representation of an object is an arrangement of modules containing a plurality of modules and connectors 1425 (relationships) between the modules. A module receives 0 to N inputs (data streams), describes a specific operation to be performed on the received input(s), and then outputs 0 to M outputs (data streams). For example, a module may be an image importer (i.e., multimedia graphic importer) 1410, text importer 1415, a special effect 1420, a video output 1440 having an internal compositing stack, etc. A module can also effect or control other modules (such as the remote controller module 1315 of FIG. 13). The specific operation described by a module is implemented by a plug-in program 1030 that contains code instructions executed by the rendering engine 1020 to perform the specific operation.

An image or text importer represents a communication port with the multimedia authoring application 1005 where multimedia graphics or text are imported from the multimedia authoring application 1005 into the patch file for processing by the rendering engine 1020 (according to the description in the patch file). A special effect module can then be used to perform a special effect (e.g., emboss, blur, fade, etc.) on an imported multimedia graphic or text. A special effect module has an input and output port where two or more special effect modules may be chained. The relationships between the modules are shown by connectors 1425 that indicate, for example, that the output of one module is the input of another module. As such, a connector 1425 represents a data stream from one module to another module.

In the example shown in FIG. 14, the image importers 1410, text importer 1415, special effects 1420, and connectors 1425 are used to produce a composite 1430 of the object. The import and special effects operations of the importer and special effects modules can be implemented through the use of plug-ins 1030 invoked and executed by the rendering engine 1020 when required. Also, the composer application 1195 may use the rendering engine 1020 as a tool to assist in the creation of a patch file 1015, for example, to give a preview of the object composite 1430 using a compositing stack 1450.

The composer application 1195 then converts the graphical representation of the object to a textual representation (e.g., XML representation) of the object, the textual representation comprising the patch file needed by the rendering engine 1020 to render the object. Each patch file contains a description of an arrangement of modules including a list of the modules and connections between the modules needed to produce the object composite 1430. Patch files are generally autonomous from the multimedia authoring application 1005. For example, special effects described in patch files can be enabled or disabled without intervention of the multimedia authoring application 1005.

Methods for Creating Menu Themes

Figure 15:
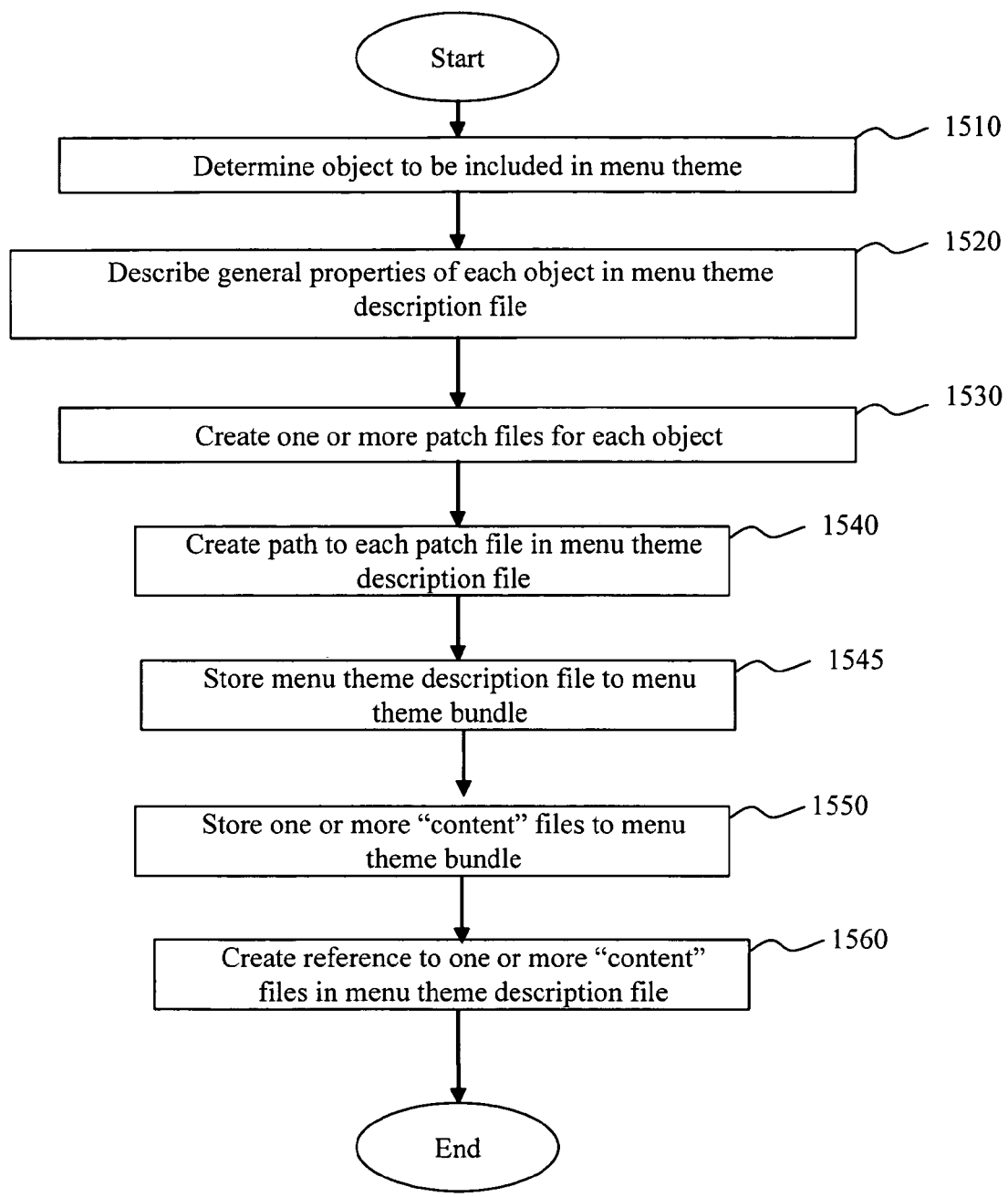
FIG. 15 is a flowchart of a method for creating a menu theme used by an authoring application to produce a multimedia menu presentation.

FIG. 15 is a flowchart of a method for creating a menu theme used by an authoring application to produce a multimedia menu presentation. The method starts when all objects to be included in the menu theme are determined (at 1510). General properties for each object are then described (at 1520) in a menu theme description file. General properties of an object may include, for example, position, size, alignment, font, color, etc. In some embodiments, objects are described in XML.

One or more patch files are then created (at step 1530) for each object included in the menu theme (discussed below in relation to FIG. 16). The one or more patch files created for an object contain a description of the object used to render the object. The description of an object in a patch file is at a lower level than the description of the object in the menu theme description file.

A path to each patch file is created (at 1540) in the menu theme description file. In some embodiments, the menu theme description file is stored (at 1545) to a menu theme bundle. One or more "content" files are then stored (at 1550) to the menu theme bundle. A stored "content" file may contain, for example, a default multimedia graphic. One or more references are then created (at 1560) in the menu theme description file to the one or more "content" files stored in the menu theme bundle. A reference to a "content" file may be, for example, a unique name or path that identifies the "content" file. When the menu theme description file is later read by a multimedia authoring application, the application sends the reference (e.g., unique name or path) to a patch file that is to receive the "content" file, the reference being used by the patch file to import the "content" file.

The following XML code in the menu theme description file defines a drop zone in one embodiment:

<key>drop zones</key>
<array>
<dict>
  <key>BoundBox</key>
  <array><!--Define Drop zone Bounding Box-->

```
            <integer>111</integer>
            <integer>64</integer>
            <integer>420</integer>
            <integer>250</integer>
        </array>
        <key>contentScale</key>
        <integer>1</integer>
        <key>defaultContentsFileList</key>
        <array>
            <string>drop zonedefcontent.tif</string>
        </array>
        <key>defaultContentsIsImage</key>
        <true/>
        <key>defaultContentsIsSlideshow</key>
        <false/>
        <key>defaultDropBehavior</key>
        <integer>0</integer>
    <!--Define highlight image-->
        <key>highlightFile</key>
        <string>Chalk6.Highlight.tif</string>
        <key>highlightIsImage</key>
        <true/>
    <!--Specify patch file that controls operation-->
        <key>imagePatchFile</key>
        <string>Drop zone</string>
        <key>maskFile</key>
        <string>Chalk6.Mask.tif</string>
        <key>maskisimage</key>
        <true/>
        <key>shapeFile</key>
        <string>Chalk6.shape.tif</string>
        <key>shapeisimage</key>
        <false/>
        <key>slideshowPatchFile</key>
        <string>Drop zone</string>
        <key>vIdeoFatchFile</key>
        <string>prop zone</string>
        <key>zLevel</key><!--Define depth-->
        <integer>0</integer>
    </dict>
</array>
```

Figure 16:
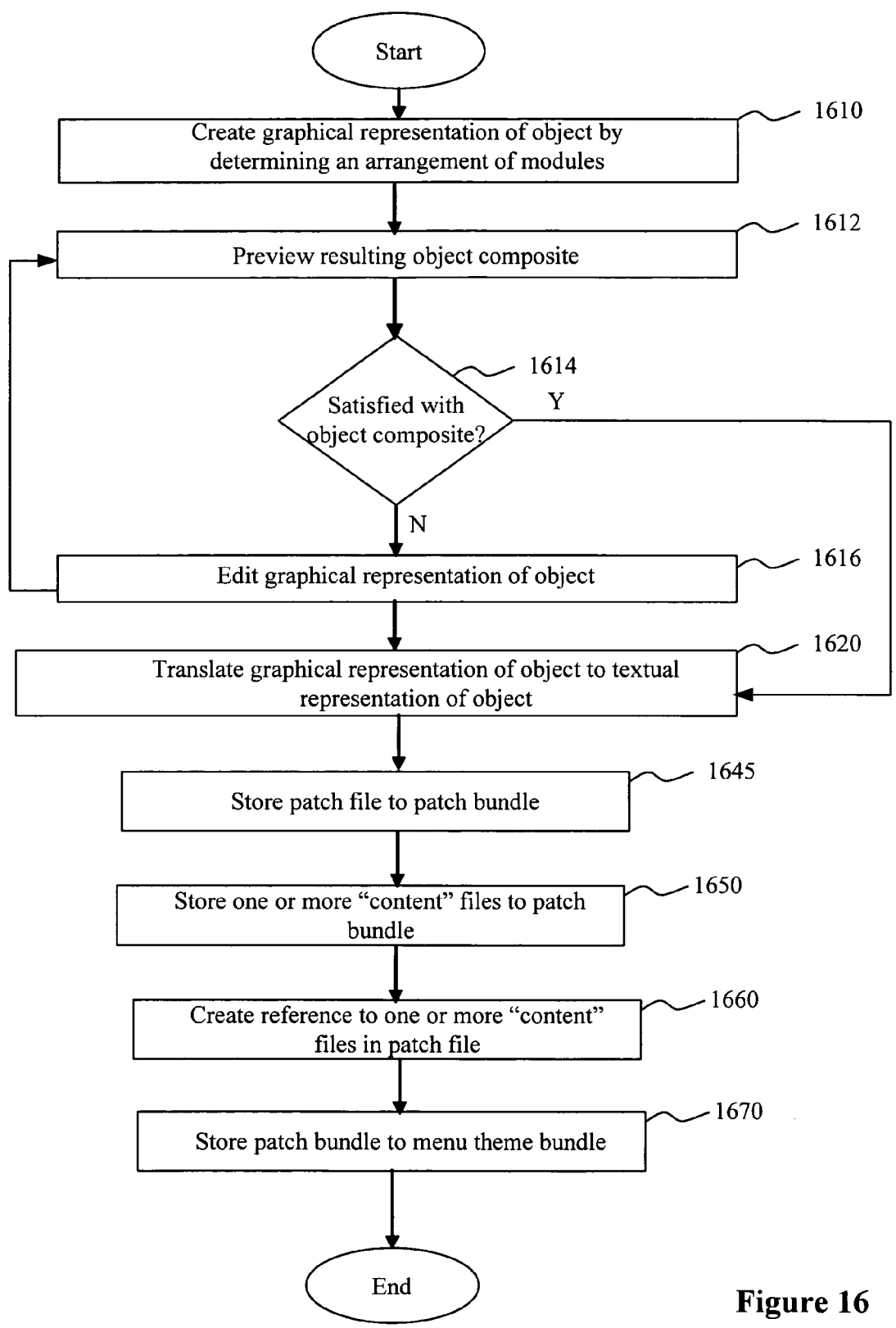
FIG. 16 is a flowchart of a method for creating a patch file used to render an object in a menu theme.

FIG. 16 is a flowchart of a method for creating a patch file used to render an object in a menu theme. In some embodiments, the method is performed with use of a composer application 1195 and a rendering engine 1020. The method starts when a graphical representation of the object is created (at 1610). The graphical representation contains an arrangement of modules. Thus, to create the graphical representation of the object, which modules to be included in the arrangement of modules must be determined as well as connections (relationships) between the modules that are needed to produce a composite of the object.

The object composite resulting from the graphical representation of the object is then previewed at step 1614 (for example, through use of a rendering engine 1020 used in conjunction with the composer application 1195). It is then determined (at 1614) if the resulting object composite is satisfactory. If not, the graphical representation of the object is edited (at 1616) and the method proceeds to step 1612. If the resulting object composite is satisfactory, the graphical representation of the object is then translated (at 1620) to a textual representation (e.g., XML representation) of the object that contains a description of the arrangement of modules including a list of the modules and the connections (relationships) between the modules. The textual representation comprises the patch file needed to render an object in the menu theme (for example, by a rendering engine 1020).

In some embodiments, the patch file is stored (at 1645) to a patch bundle. One or more "content" files are then stored (at 1650) to the patch bundle. A stored "content" file may contain, for example, an animation movie. One or more references are then created (at 1660) in the patch file to the one or more "content" files stored in the patch bundle. A reference to a "content" file may be, for example, a unique name or path that identifies the "content" file. When the patch file is later read by a rendering engine, the reference (e.g., unique name or path) is used to import the "content" file identified by the reference into the patch file or rendering engine. In some embodiments, the patch bundle is stored (at 16 70) to a menu theme bundle, the patch bundle being a sub-folder of the menu theme bundle.

For objects having two or more components (such as the selectable menu buttons 910 shown in FIG. 9), the method of FIG. 16 is performed for each component of the object to create a patch file used to render a single component of the object.

Figure 17:
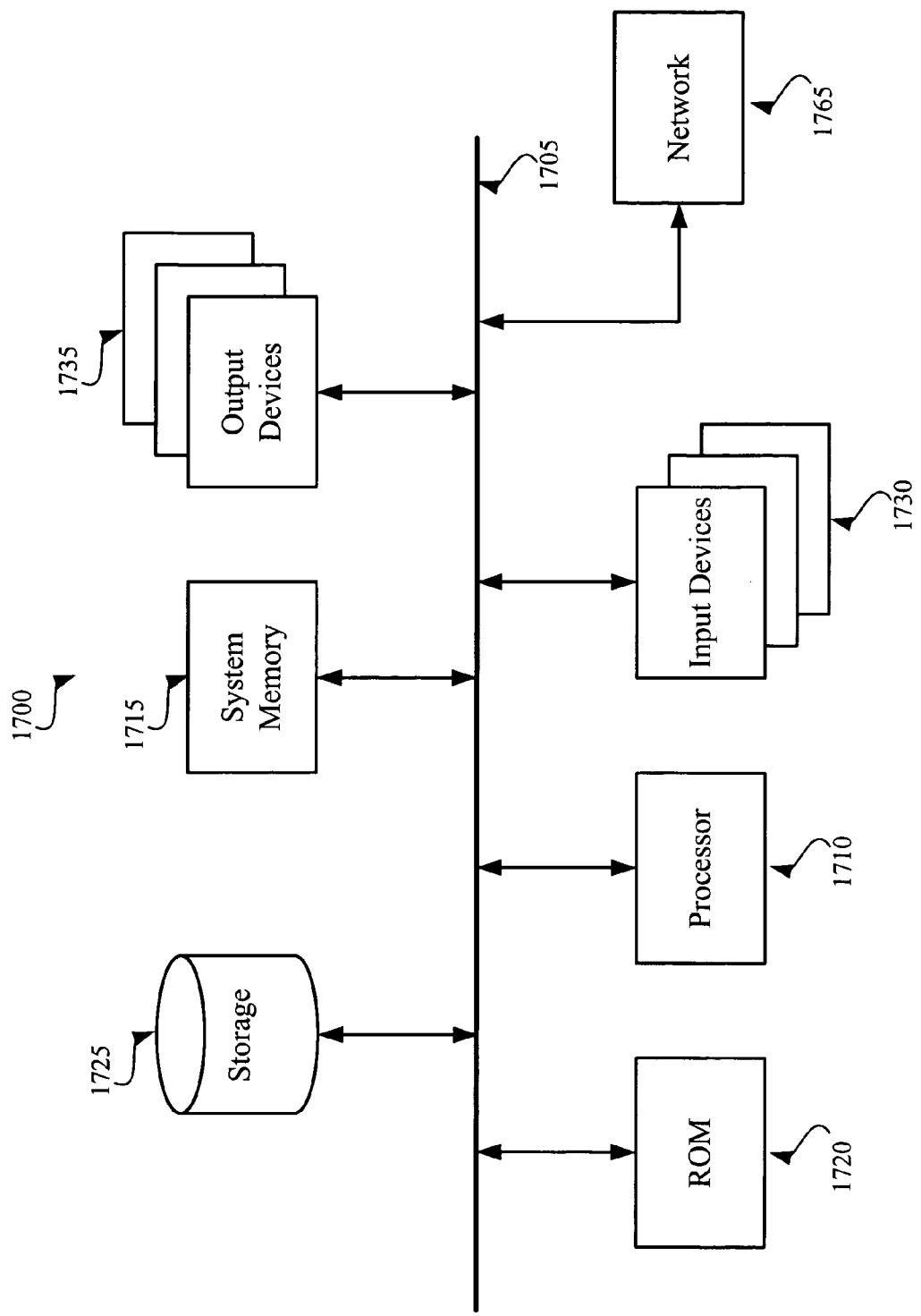
FIG. 17 presents a computer system with which some embodiments of the invention are implemented.

FIG. 17 presents a computer system 1700 with which some embodiments of the invention are implemented. The computer system 1700 includes a bus 1705, a processor 1710, a system memory 1715, a read-only memory 1720, a permanent storage device 1725, input devices 1730, and output devices 1735.

The bus 1705 collectively represents all system, peripheral, and chipset buses that communicatively connect the numerous internal devices of the computer system 1700. For instance, the bus 1705 communicatively connects the processor 1710 with the read-only memory 1720, the system memory 1715, and the permanent storage device 1725.

The read-only-memory (ROM) 1720 stores static data and instructions that are needed by the processor 1710 and other modules of the computer system. The permanent storage device 1725, on the other hand, is read-and-write memory device. This device is a non-volatile memory unit that stores instruction and data even when the computer system 1700 is off. Some embodiments of the invention use a mass-storage device (such as a magnetic or optical disk and its corresponding disk drive) as the permanent storage device 1725. Other embodiments use a removable storage device (such as a floppy disk or Zip® disk, and its corresponding disk drive) as the permanent storage device.

Like the permanent storage device 1725, the system memory 1715 is a read-and-write memory device. However, unlike storage device 1725, the system memory is a volatile read-and-write memory, such as a random access memory (RAM). The system memory stores some of the instructions and data that the processor needs at runtime.

In some embodiments, instructions, descriptions, and/or data needed to perform methods of the present invention are stored in the system memory 1715, the permanent storage device 1725, the read-only memory 1720, or any combination of the three. For example, the various memory units may contain the multimedia authoring application, rendering engine application, plug-in programs, menu theme description file, patch files, and "content" files used in the present invention. From these various memory units, the processor 1710 retrieves instructions, descriptions, and/or data to perform the processes of the present invention.

The bus 1705 also connects to the input and output devices 1730 and 1735. The input devices 1730 enable a user to communicate information and select commands to the computer system 1700. For instance, the input devices 1730 enable the user to communicate user information 1017 to the computer system 1700 and interact with the multimedia authoring application 1005. The input devices 1730 include alphanumeric keyboards and cursor-controllers. The output devices 1735 display images generated by the computer system 1700. For instance, these devices display a user interface (e.g., graphical user interface) through which the user can interface with the computer system 1700. The output devices include printers and display devices, such as cathode ray tubes (CRT) or liquid crystal displays (LCD).

Finally, as shown in FIG. 17, the bus 1705 also couples the computer system 1700 to a network 1765 through, for example, a network adapter (not shown). In this manner, the computer system 1700 can be a part of a network of computers (such as a local area network ("LAN"), a wide area network ("WAN"), or an Intranet) or a network of networks (such as the Internet). Any or all of the components of the computer system 1700 may be used in conjunction with the present invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method comprising:
   defining a set of objects to be included in a menu theme template for producing a multimedia menu comprising a plurality of user-selectable menu controls for navigating a multimedia presentation, said set of objects comprising a drop zone area object for receiving and displaying content selected by a user while the multimedia menu is being authored,
   wherein said defining comprises defining properties for the set of objects in a menu theme description file;
   defining a set of modules for rendering the set of objects, each module providing a particular functionality for rendering a particular object in the set of objects;
   defining a set of paths to said set of modules; and
   defining a rendering engine for compositing a user-editable version of the menu theme template based on the properties defined in the menu theme description file and the set of objects rendered according to the set of modules, said rendering engine using the set of paths to identify the set of modules, said menu theme template for allowing the user to author the multimedia menu.

2. The method of claim 1, wherein the properties of the drop zone area object comprise position and size of the drop zone area object in the menu theme template.

3. The method of claim 1, wherein the rendered drop zone area object in the menu theme template comprises an area for displaying the content that is dropped into the drop zone area object.

4. The method of claim 1, wherein the properties are defined in Extensible Markup Language (XML).

5. The method of claim 1, wherein defining the set of paths comprise comprises defining a patch file that comprises a description of the set of modules and relationships between the set of modules.

6. The method of claim 1, wherein the set of modules comprises a special effect module, wherein the drop zone is further for displaying the content by using the special effect module to apply a visual effect to the content.

7. The method of claim 1 further comprising:
   storing the menu theme description file in a menu theme bundle; and
   storing one or more content files in the menu theme bundle.

8. The method of claim 1 further comprising:
   defining a reference to a content file in the menu theme description file, wherein said reference comprises data for importing said content file.

9. The method of claim 8, wherein the content file comprises data of a multimedia graphic, animation movie, or audio clip.

10. The method of claim 1, wherein:
    a particular object in the menu theme template comprises at least two components, and
    said defining said set of paths comprises creating a path to multiple sets of data for each component of the particular object, wherein each of said sets of data is for rendering a component of the particular object.

11. The method of claim 1, wherein the set of objects further comprises a selectable menu button having at least one of a textual component and a graphical component.

12. The method of claim 11, wherein the graphic component comprises a drop zone area for allowing the user to select a multimedia graphic to be presented in the graphic component by dropping the multimedia graphic into the drop zone area.

13. The method of claim 1, wherein the drop zone area object is an object having a drop zone area that allows the user to view the content in the drop zone area when the drop zone area receives the content selected by the user.

14. The method of claim 1, wherein said set of paths comprises, for each object, a path to a patch file that is used to render the object.

15. A computer readable medium storing a computer program for execution by at least one processor, the computer program comprising:
    a set of instructions for defining a set of objects to be included in a menu theme template for producing a multimedia menu comprising a plurality of user-selectable menu controls for navigating a multimedia presentation, said set of objects comprising a drop zone area object for receiving and displaying content selected by a user while the multimedia menu is being authored, wherein said set of instructions for defining the set of object comprises a set of instructions for defining properties for the set of objects in a menu theme description file;
    a set of instructions for defining a set of modules for rendering the set of objects, each module providing a particular functionality for rendering a particular object in the set of objects;
    a set of instructions for defining a set of paths to said set of modules; and
    a set of instructions for defining a rendering engine for compositing a user-editable version of the menu theme template based on the properties defined in the menu theme description file and the set of objects rendered according to the set of modules, said rendering engine using the set of paths to identify the set of modules, said menu theme template for allowing the user to author the multimedia menu.

16. The computer readable medium of 15, wherein the properties of the drop zone area object comprise position and size of the drop zone area object in the menu theme template.

17. The computer readable medium of claim 15, wherein the rendered drop zone area object in the menu theme template comprises an area for displaying the content that is dropped into the drop zone area object.

18. The computer readable medium of claim 15, wherein the properties are defined in Extensible Markup Language (XML).

19. The computer readable medium of claim 15, wherein the set of instructions for defining the set of paths comprises a set of instructions for defining a patch file that comprises a description of the set of modules and relationships between the set of modules.

20. The computer readable medium of claim 15, wherein the set of modules comprises a special effect module, wherein the drop zone is further for displaying the content by using the special effect module to apply a visual effect to the content.

21. The computer readable medium of claim 15, wherein the computer program further comprises:
   a set of instructions for storing the menu theme description file in a menu theme bundle; and
   a set of instructions for storing one or more content files in the menu theme bundle.

22. The computer readable medium of claim 15, wherein the computer program further comprises a set of instructions for defining a reference to a content file in the menu theme description file, wherein said reference comprises data for importing said content file.

23. The computer readable medium of claim 22, wherein the content file comprises data of a multimedia graphic, animation movie, or audio clip.

24. The computer readable medium of claim 15, wherein:
   a particular object in the menu theme template comprises at least two components, and
   said set of instructions for defining said set of paths comprises a set of instructions for creating a path to multiple sets of data for each component of the particular object, wherein each of said sets of data is for rendering a component of the particular object.

25. The computer readable medium of claim 15, wherein the set of objects further comprises a selectable menu button having at least one of a textual component and a graphical component.

26. The computer readable medium of claim 25, wherein the graphic component comprises a drop zone area for allowing the user to select a multimedia graphic to be presented in the graphic component by dropping the multimedia graphic into the drop zone area.

27. The computer readable medium of claim 15, wherein the drop zone area object is an object having a drop zone area that allows the user to view the content in the drop zone area when the drop zone area receives the content selected by the user.

28. The computer readable medium of claim 15, wherein said set of paths comprises, for each object, a path to a patch file that is used to render the object.

29. A system comprising:
   at least one processor; and
   a storage storing:
      a menu theme library comprising a menu theme template that includes a set of objects for producing a multimedia menu comprising a plurality of user-selectable menu controls for navigating a multimedia presentation, said set of objects comprising a drop zone area object for receiving and displaying content selected by a user while the multimedia menu is being authored, wherein properties for the set of objects are defined in a menu theme description file;
      a set of modules identified by a set of paths for rendering the set of objects, each module providing a particular functionality for rendering a particular object in the set of objects; and
      a rendering engine for compositing a user-editable version of the menu theme template based on the properties defined in the menu theme description file and the set of objects rendered according to the set of modules, said rendering engine using the set of paths to identify the set of modules, said menu theme template for allowing the user to author the multimedia menu.

30. The system of claim 29, wherein the properties of the drop zone area object comprise position and size of the drop zone area object in the menu theme template.

31. The system of claim 29, wherein the rendered drop zone area object in the menu theme template comprises an area for displaying the content that is dropped into the drop zone area object.

32. The system of claim 29, wherein the properties are defined in Extensible Markup Language (XML).

33. The system of claim 29, wherein the set of paths is defined in a patch file that comprises a description of the set of modules and relationships between the set of modules.

34. The system of claim 29, wherein the set of modules comprises a special effect module, wherein the drop zone is further for displaying the content by using the special effect module to apply a visual effect to the content.

35. The system of claim 29, wherein the storage further stores:
   a menu theme bundle for storing (i) the menu theme description file and (ii) one or more content files.

36. The system of claim 29, wherein a reference to a content file is defined in the menu theme description file, wherein said reference comprises data for importing said content file.

37. The system of claim 36, wherein the content file comprises data of a multimedia graphic, animation movie, or audio clip.

38. The system of claim 29, wherein the set of objects further comprises a selectable menu button having at least one of a textual component and a graphical component.

* * * * *

UNITED STATES PATENT AND TRADEMARK OFFICE
CERTIFICATE OF CORRECTION

| | |
|---|---|
| PATENT NO. | : 7,840,905 B1 |
| APPLICATION NO. | : 10/742957 |
| DATED | : November 23, 2010 |
| INVENTOR(S) | : Ralf Weber et al. |

It is certified that error appears in the above-identified patent and that said Letters Patent is hereby corrected as shown below:

In column 13, line 36, delete "videoFatchFile" and insert -- videoPatchFile --, therefor.

In column 15, line 58, in Claim 5, delete "comprise comprises" and insert -- comprises --, therefor.

Signed and Sealed this
Twenty-fifth Day of October, 2011

David J. Kappos
*Director of the United States Patent and Trademark Office*